(12) United States Patent
Luo et al.

(10) Patent No.: US 9,042,240 B2
(45) Date of Patent: May 26, 2015

(54) SYSTEMS, APPARATUS AND METHODS FOR BROADCAST CHANNEL DECODING

(75) Inventors: Tao Luo, San Diego, CA (US); Taesang Yoo, San Diego, CA (US); Kibeom Seong, West New York, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 482 days.

(21) Appl. No.: 12/845,649

(22) Filed: Jul. 28, 2010

(65) Prior Publication Data

US 2011/0026645 A1 Feb. 3, 2011

Related U.S. Application Data

(60) Provisional application No. 61/230,668, filed on Jul. 31, 2009.

(51) Int. Cl.
*H04L 27/06* (2006.01)
*H04L 1/00* (2006.01)
*H04W 48/16* (2009.01)

(52) U.S. Cl.
CPC .............. *H04L 1/0038* (2013.01); *H04W 48/16* (2013.01)

(58) Field of Classification Search
CPC .............................. H04L 1/0038; H04W 48/16
USPC .......................................................... 370/252
See application file for complete search history.

(56) References Cited

U.S. PATENT DOCUMENTS

| | | | |
|---|---|---|---|
| 6,438,121 B1 | 8/2002 | Hammons, Jr. et al. | |
| 2005/0147058 A1* | 7/2005 | Tarnanen et al. | 370/310 |
| 2006/0203823 A1 | 9/2006 | Jiang | |
| 2008/0205331 A1* | 8/2008 | Jeong et al. | 370/328 |
| 2008/0212522 A1* | 9/2008 | Ko et al. | 370/328 |
| 2008/0318566 A1* | 12/2008 | Chun et al. | 455/422.1 |

(Continued)

FOREIGN PATENT DOCUMENTS

| | | |
|---|---|---|
| CN | 101090304 A | 12/2007 |
| EP | 1959704 | 8/2008 |

(Continued)

OTHER PUBLICATIONS

International Search Report and Written Opinion—PCT/US2010/044024, International Searching Authority—European Patent Office, Nov. 2, 2010.

(Continued)

*Primary Examiner* — Luat Phung
(74) *Attorney, Agent, or Firm* — Anthony R. Morris

(57) ABSTRACT

Techniques for reliable channel decoding in a wireless network are provided. In one aspect, a wireless device receives system information over a physical broadcast channel of a downlink transmission. The wireless device decodes the physical broadcast channel of a current radio frame using a plurality of hypotheses until the decoding passes a cyclic redundancy check. Thereafter, the wireless device compares system information from the current radio frame with information obtained from a previous radio frame. The information from the previous radio frame may include one or more network parameters which may be stored in a memory of the wireless device. In some aspects, the comparison may be performed over a plurality of radio frames. Based at least in part on a result of the comparing, the wireless device may selectively reject system information from one or more of the radio frames.

60 Claims, 16 Drawing Sheets

(56) References Cited

U.S. PATENT DOCUMENTS

| | | | |
|---|---|---|---|
| 2009/0052356 A1* | 2/2009 | Lim et al. | 370/280 |
| 2009/0245211 A1* | 10/2009 | Kim et al. | 370/336 |
| 2010/0074448 A1 | 3/2010 | Park et al. | |
| 2011/0299495 A1* | 12/2011 | Choi et al. | 370/329 |

FOREIGN PATENT DOCUMENTS

| | | |
|---|---|---|
| JP | H03210848 A | 9/1991 |
| JP | 2001339466 A | 12/2001 |
| JP | 2003527040 A | 9/2003 |
| JP | 2006211632 A | 8/2006 |
| WO | 0169870 A1 | 9/2001 |
| WO | WO2008136574 | 11/2008 |
| WO | 2009041785 A2 | 4/2009 |

OTHER PUBLICATIONS

Motorola: "P-BCH Design", 3GPP Draft; R1-072665—P-BCH, 3rd Generation Partnership Project (3GPP), Mobile Competence Centre ; 650, Route Des Lucioles ; F-06921 Sophia-Antipolis Cedex ; France, vol. RAN WGI, no. Orlando, USA; 20070620, Jun. 20, 2007, XP050106362, [retrieved on Jun. 20, 2007].

Qualcomm Europe, "On the eNodeB Tx Antenna Configuration in PBCH", 3GPP TSG-RAN WG1#51bis, Jan. 14-18, 2008, Sevilla, Spain, R1-080489, URL: http://www.3gpp.org/ftp/tsg_ran/WG1_RL1/TSGR1_51b/Docs/R1-080489.zip.

Taiwan Search Report—TW099125466—TIPO—Mar. 2, 2013.

* cited by examiner

SYSTEMS, APPARATUS AND METHODS FOR BROADCAST CHANNEL DECODING

CROSS-REFERENCE TO RELATED APPLICATIONS

This application claims the benefit of U.S. Provisional Patent Application Ser. No. 61/230,668, filed Jul. 31, 2009, which is titled "False Alarm Protection for Physical Broadcast Channel Blind Decoding," and the entire contents of which are incorporated herein by reference.

BACKGROUND

I. Field

The following description relates generally to wireless communications and, more particularly, to decoding transmissions in a wireless communication system.

II. Background

Wireless communication systems are widely deployed to provide various types of communication. For instance, voice and/or data can be provided via such wireless communication systems. A typical wireless communication system, or network, can provide multiple users access to one or more shared resources (e.g., bandwidth, transmit power). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple access communication systems can simultaneously support communication for multiple user equipment (UEs). Each UE can communicate with one or more access points (APs) or base stations (BSs) via transmissions on forward and reverse links. The forward link (or downlink (DL)) refers to the communication link from BSs to UEs, and the reverse link (or uplink (UL)) refers to the communication link from UEs to BSs.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with decoding on the PBCH.

In one aspect, a method is provided. The method can include: decoding a broadcast channel of a current radio frame to obtain system information associated with a wireless network; comparing the system information of the current radio frame with system information obtained from a previous radio frame; and selectively rejecting the system information of the current radio frame based at least in part on a result of the comparing.

In another aspect, a computer program product including a computer-readable medium is provided. The computer program product can include: a first set of codes for causing a computer to decode a broadcast channel of a current radio frame to obtain system information associated with a wireless network; a second set of codes for causing the computer to compare the system information of the current radio frame with system information obtained from a previous radio frame; and a third set of codes for causing the computer to selectively reject the system information of the current radio frame based at least in part on a result of the comparing.

In another aspect, an apparatus is provided. The apparatus can include: means for decoding a broadcast channel of a current radio frame to obtain system information associated with a wireless network; means for comparing the system information of the current radio frame with system information obtained from a previous radio frame; and means for selectively rejecting the system information of the current radio frame based at least in part on a result of the comparing.

In yet another aspect, an apparatus is provided. The apparatus can include: a physical broadcast channel (PBCH) decoding module configured to: decode a broadcast channel of a current radio frame to obtain system information associated with a wireless network; compare the system information of the current radio frame with system information obtained from a previous radio frame; and selectively reject the system information of the current radio frame based at least in part on a result of the comparing.

In a further aspect, a method is provided. The method can include: receiving a downlink signal comprising a physical broadcast channel (PBCH); decoding the PBCH to obtain a first decoded PBCH payload; detecting an error condition related to the first decoded PBCH payload based at least in part on a second decoded PBCH payload obtained prior to the first decoded PBCH payload; and rejecting the first decoded PBCH payload in response to detecting the error condition.

In one aspect, a computer program product including a computer-readable medium is provided. The computer program product can include: a first set of codes for causing a computer to receive a downlink signal comprising a physical broadcast channel (PBCH); a second set of codes for causing the computer to decode the PBCH to obtain a first decoded PBCH payload; a third set of codes for causing the computer to detect an error condition related to the first decoded PBCH payload based at least in part on a second decoded PBCH payload obtained prior to the first decoded PBCH payload; and a fourth set of codes for causing the computer to reject the first decoded PBCH payload in response to detecting the error condition.

In another aspect, an apparatus is provided. The apparatus can include: means for receiving a downlink signal comprising a physical broadcast channel (PBCH); means for decoding the PBCH to obtain a first decoded PBCH payload; means for detecting an error condition related to the first decoded PBCH payload based at least in part on a second decoded PBCH payload obtained prior to the first decoded PBCH payload; and means for rejecting the first decoded PBCH payload in response to detecting the error condition.

In yet another aspect, an apparatus is provided. The apparatus can include: a transceiver configured to receive a downlink signal comprising a physical broadcast channel (PBCH); a PBCH decoding module configured to: decode the PBCH to obtain a first decoded PBCH payload; detect an error condition related to the first decoded PBCH payload based at least in part on a second decoded PBCH payload obtained prior to the first decoded PBCH payload; and reject the first decoded PBCH payload in response to detecting the error condition.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of

DETAILED DESCRIPTION

Figure 1:
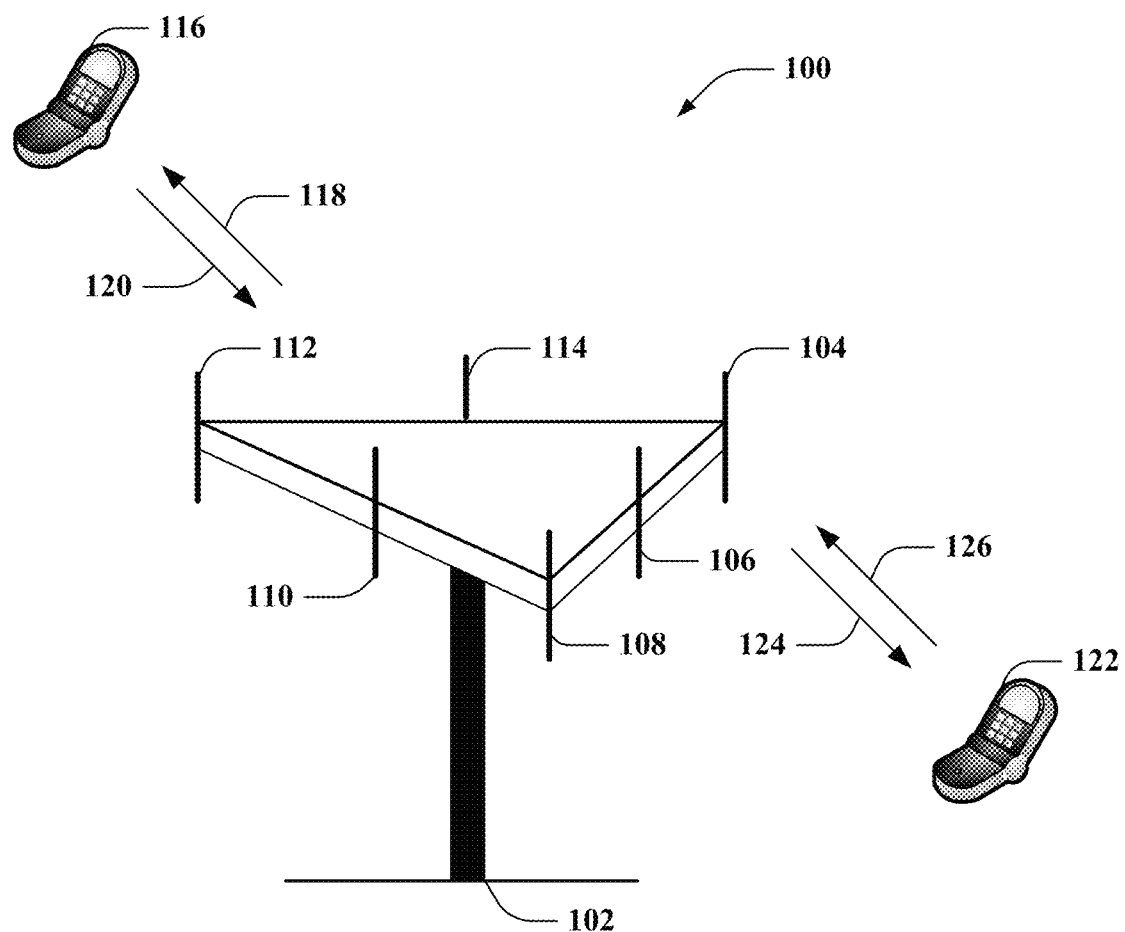
FIG. 1 shows an example wireless communication system for reliable channel decoding in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and/or other systems. The terms "system" and "network" are often used interchangeably. A CDMA system can implement a radio technology such as Universal Terrestrial Radio Access (UTRA), CDMA8020, etc. UTRA includes Wideband-CDMA (W-CDMA) and other variants of CDMA. CDMA8020 covers IS-8020, IS-95 and IS-856 standards. An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA8020 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA can have similar performance and essentially the same overall complexity as those of an OFDMA system. A SC-FDMA signal can have lower peak-to-average power ratio (PAPR) because of its inherent single carrier structure. SC-FDMA can be used, for instance, in uplink communications where lower PAPR greatly benefits UEs in terms of transmit power efficiency. Accordingly, SC-FDMA can be implemented as an uplink multiple access scheme in 3GPP Long Term Evolution (LTE) or Evolved UTRA.

Various embodiments are described herein in connection with UEs. A UE can also be called a system, subscriber unit, subscriber station, mobile station, mobile, remote station, remote terminal, mobile device, access terminal, wireless communication device, user agent or user device. A UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with an access point (AP). An AP can be utilized for communicating with UEs and can also be referred to as a base station (BS), femto node, pico node, Node B, Evolved Node B (eNodeB, eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include, but are not limited to, non-transitory storage media such as magnetic storage devices (e.g., hard disk, floppy disk, magnetic strips), optical disks (e.g., compact disk (CD), digital versatile disk (DVD)), smart cards, and flash memory devices (e.g., EPROM, card, stick, key drive). Additionally, various storage media described herein can represent one or more devices and/or other machine-readable media for storing information. The term "machine-readable medium" can include storage media and/or various media capable of storing, containing, and/or carrying codes and/or instruction(s) and/or data.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). A UE moves through such a network. The UE may be served in certain locations by APs that provide macro coverage while the UE may be served at other locations by APs that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as a BS, access point, eNodeB, macro cell, and so on. Also, a femto node may be configured or referred to as a Home NodeB, Home eNodeB, access point access node, a BS, a femto cell, and so on.

Referring now to FIG. 1, a wireless communication system 100 is illustrated in accordance with various embodiments presented herein. System 100 includes a BS 102 that can include multiple antenna groups. For example, one antenna group can include antennas 104, 106, another group can comprise antennas 108, 110, and an additional group can include antennas 112, 114. Two antennas are illustrated for each antenna group; however, more or fewer antennas can be utilized for each group. BS 102 can additionally include a transmitting node chain and a receiving node chain, each of which can in turn comprise a plurality of components associated with signal transmission and reception (e.g., processors, modulators, multiplexers, demodulators, demultiplexers, antennas), as will be appreciated by one skilled in the art.

BS 102 can communicate with one or more UEs such as UE 116, 122. However, it is to be appreciated that BS 102 can communicate with substantially any number of UEs similar to UEs 116, 122. UEs 116, 122 can be, for example, cellular phones, smart phones, laptops, handheld communication devices, handheld computing devices, satellite radios, global positioning systems, PDAs, and/or any other suitable device for communicating over wireless communication system 100. As depicted, UE 116 is in communication with antennas 112, 114, where antennas 112, 114 transmit information to UE 116 over DL 118 and receive information from UE 116 over a UL 120. Moreover, UE 122 is in communication with antennas 104, 106, where antennas 104, 106 transmit information to UE 122 over a DL 124 and receive information from UE 122 over a UL 126. In a frequency division duplex (FDD) system, DL 118 can utilize a different frequency band than that used by UL 120, and DL 124 can employ a different frequency band than that employed by UL 126, for example. Further, in a time division duplex (TDD) system, DL 118 and UL 120 can utilize a common frequency band and DL 124 and UL 126 can utilize a common frequency band.

Base station 102 can transmit system information to UEs 116, 122 on DL 124. The system information, which can be employed in decoding control and data channels, can be prone to interference from other cells. System 100 increases the reliability of channel decoding. In one embodiment, UEs 116, 122 may be configured to detect false alarms in connection with blind decoding of control channel information. As used herein, a "false alarm" can refer to an event wherein the UEs 116, 122 performs blind decoding of a control channel with a hypothesis that is not correct, but for which error checking indicates a correct and accurate decoding. For example, UEs 116, 122 may perform blind decoding of a physical broadcast channel (PBCH) having a 40 ms transmission time interval (TTI) when only a 10 ms radio frame boundary is known. In order to decode the PBCH, the UEs 116, 122 may assume multiple TTI boundaries (e.g., four) or make multiple channel decoding hypotheses. Despite error checking, in some cases, control information can become corrupted resulting in a false alarm. Methods described herein can enable rejection of such false alarms for increased decoding reliability.

Figure 2:
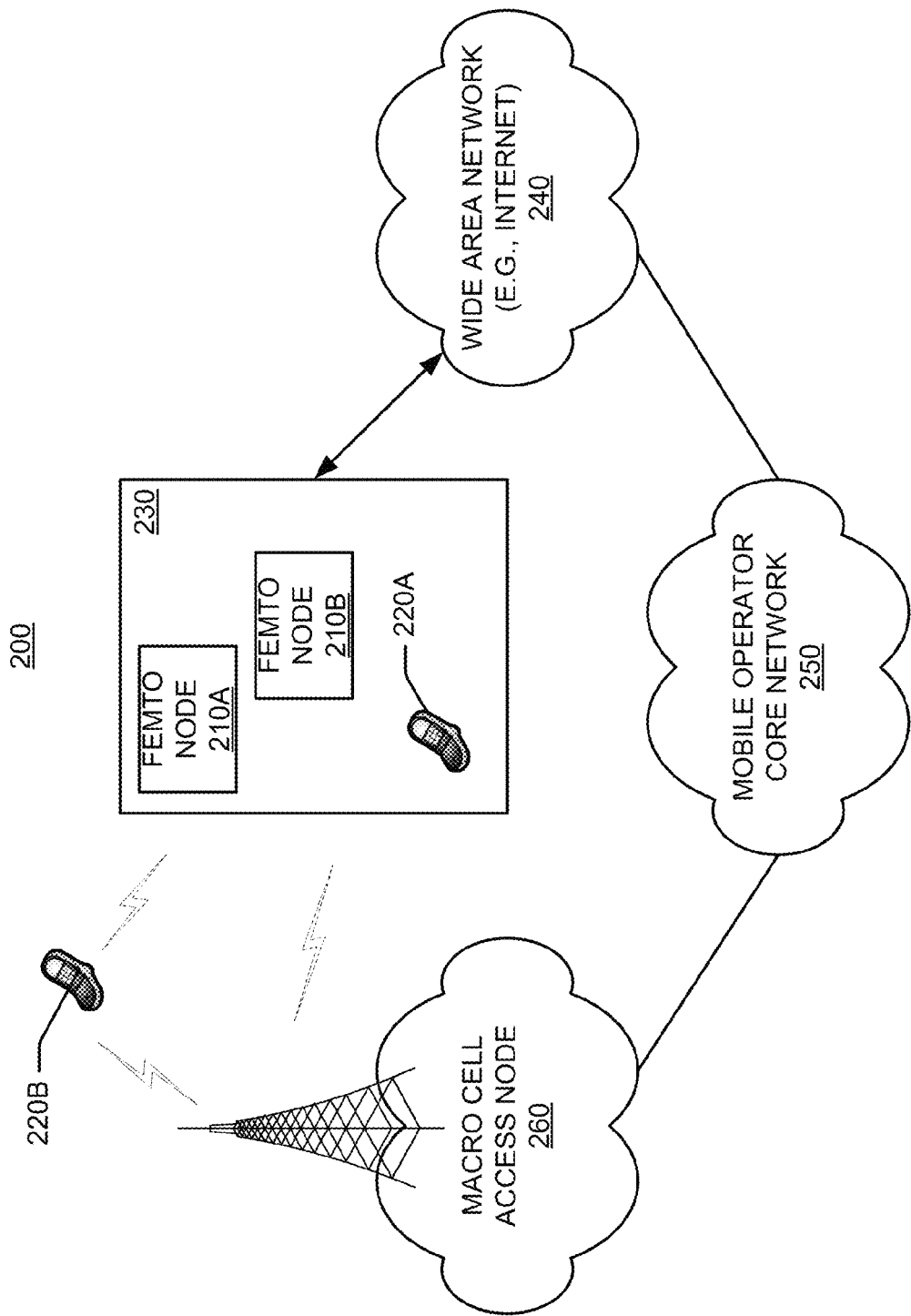
FIG. 2 illustrates an exemplary wireless communication system where one or more femto nodes are deployed in accordance with various aspects set forth herein.

FIG. 2 is an illustration of an example wireless communication system where one or more femto nodes are deployed in accordance with various aspects set forth herein. The system 200 is a heterogeneous network including a wide area network 240, femto cell 230, a macro cell access node 260 and mobile operator core network 250. Specifically, the system 200 includes multiple femto nodes 210 (e.g., femto nodes 210A and 210B) installed in a relatively small scale network environment (e.g., in one or more user residences 230). Each femto node 210 can be coupled to a wide area network 240 (e.g., the Internet) and a mobile operator core network 250 via a DSL router, a cable modem, a wireless link, or other connectivity means (not shown). As will be discussed below, each femto node 210 can be configured to serve associated UEs (e.g., associated UE 220A) and, optionally, alien UEs (e.g., alien UE 220B). In other words, access to femto nodes 210 may be restricted whereby a given UE 220 can be served by a set of designated (e.g., home) femto node(s) 210 but may not be served by any non-designated femto nodes 210 (e.g., a neighbor's femto node 210).

In various embodiments, an associated UE 220A can experience interference on the DL from a femto node 210 serving an alien UE 220B. Similarly, a femto node 210 associated with associated UE 220A can experience interference on the UL from the alien UE 220B. With heterogeneous networks, there is also a potential for interference from neighboring cells (e.g., femto cells or pico cells). As such, decoding control and data channels can be difficult. While the foregoing description of has been provided with reference to a femto node, it should be appreciated that it is also applicable to pico nodes and larger coverage areas.

The physical broadcast channel (PBCH) can convey time-sensitive information which may also be affected by interference which can affect decoding. For example, UEs 220A, 220B may attempt to receive a PBCH from the BS 102. The occurrence of PBCH false alarms can reduce the likelihood for properly decoding the time-sensitive control and data channels. As one example, using a 16-bit cyclic redundancy check (CRC) and assuming 12 blind decoding operations (corresponding to four redundancy value (RV) indices, and 3 transmit (TX) antennas) performed per radio frame, one false alarm may be expected to occur at least once every $2^{16}/12=5461$ radio frames, which can be approximately every 55 seconds.

Figure 3A:
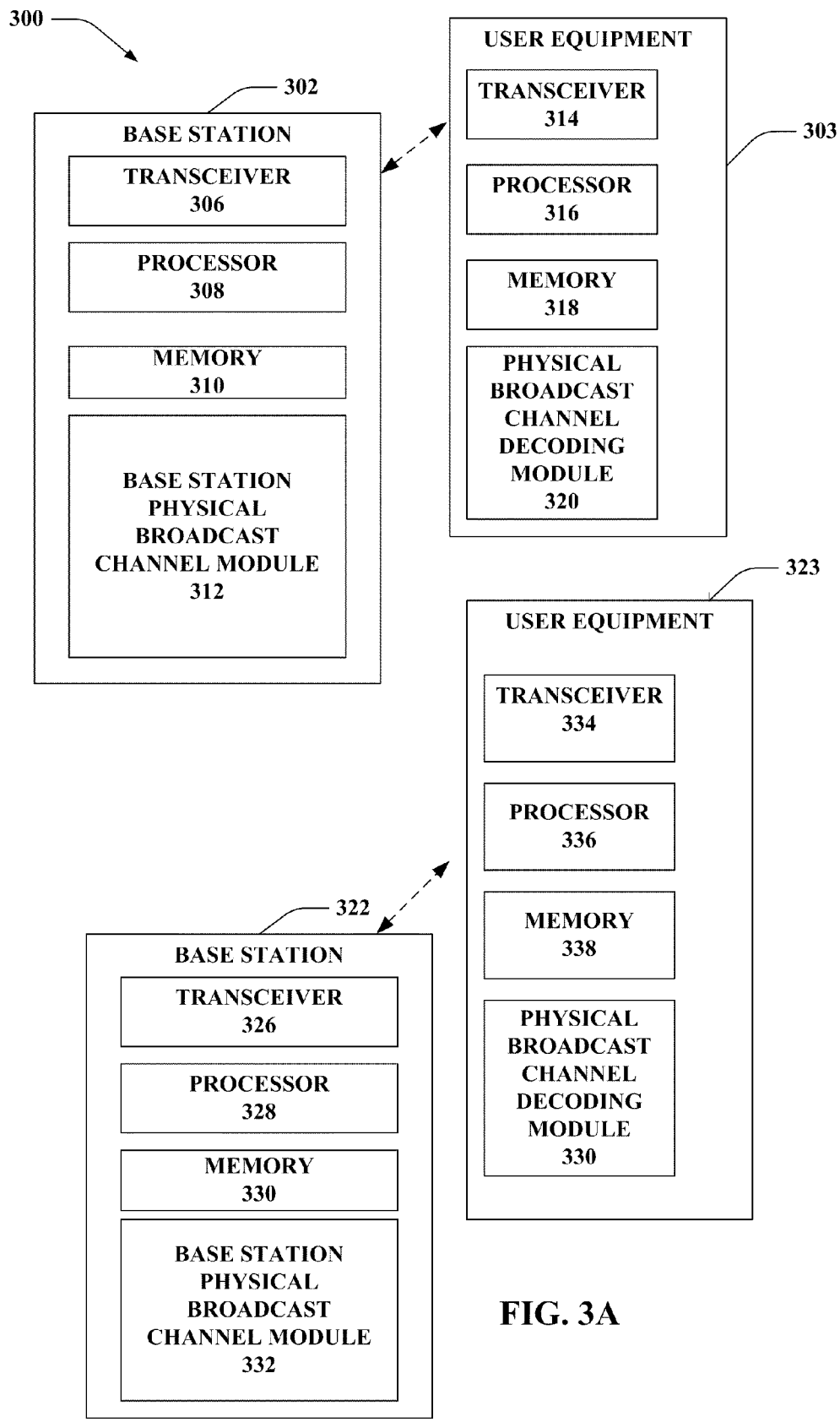
FIGS. 3A, 3B, 3C, 3D, 3E, 3F and 3G are block diagrams depicting aspects a wireless communication system for reliable channel decoding in accordance with various aspects set forth herein.

In order to improve decoding reliability, particular when blind decoding PBCH transmissions, embodiments described herein can provide a PBCH decoding module 320, 330 such as that described below with reference to FIG. 3A. The PBCH decoding module 320, 330 can be configured to be robust to a strong interference environment. FIG. 3A is an illustration of an example block diagram of a wireless communication system for reliable channel decoding in accordance with various aspects set forth herein. The BSs 302, 322 can include transceivers 306, 326, processors 308, 328, and memory 310, 330, respectively, for respectively transmitting and receiving, processing and storing data and/or control information described herein. In some embodiments, the BSs 302, 322 can perform encoding of data and/or control information that can be later decoded (including with blind decoding techniques) by the UEs 304, 324.

The BSs 302, 322 can also include BS physical broadcast channel modules 312, 332. The BS physical broadcast channel modules 312, 332 can be configured to prepare data and/or control information that is acquired by UEs 304, 324 through blind decoding. For example, the BS physical broadcast channel modules 312, 332 can prepare payloads including a bandwidth field, a reserved field, a system frame number (SFN), etc. In some configurations, redundancy version (RV) information may be carried in coded bits wherein different segments of an encoded bit sequence are transmitted in different radio frames. Additionally, information for a cyclic redundancy check may be added to support integrity checking.

By way of further example, the BS physical broadcast channel modules 312, 332 can include Master Information Block (MIB) information using resource blocks at or near the center of the channel. The information can convey any number of different types of control information, including, but not limited to, system bandwidth and antenna configuration, etc.

In some embodiments, preparation and processing on the PBCH can be as follows. The PBCH may include a payload of 40 bits, including a 16-bit CRC, which can be transmitted over 72 center subcarriers, i.e., with a frequency span of 1.08 MHz at the center of the band. For example, the PBCH can carry physical layer parameters such as: DL system bandwidth (3 bits); physical hybrid automatic repeat request indicator channel (PHICH) duration (1 bit), the number of PHICH groups (2 bits) and a System Frame Number (SFN) (8 bits). The remaining 10 bits in the payload may be reserved for future use. PHICH duration field is set to 0 for normal PHICH duration (1 OFDM symbol) and set to 1 for extended PHICH duration (3 OFDM symbols). The SFN field includes the 8 most significant bits (MSBs) of 10-bit system frame number. The other 2 least significant bits (LSBs) of the 10-bit SFN can be known by decoding PBCH with 40 ms frame length.

PBCH information may be carried on each preamble with a 40 ms TTI. In the preamble, the first four OFDM symbols in the second slot may be dedicated for the PBCH. In PBCH transmission, all RS tones may be reserved regardless of the number of transmit antennas. Thus, the number of PBCH tones for each preamble is 72×4−(24×2)=240, which can be the same for 1 TX, 2 TX, and 4 TX cases.

Prior to transmission from the BS 302, 322, a 16-bit CRC can be attached to the PBCH information of 24 bits, and then the combined 40 bits may be encoded based on tail-biting convolutional code (TBCC) to generate a codeword of 120 bits. After the 32-column interleaving operation, rate matching is performed by using a circular buffer to implement the repetition coding, and then binary scrambling and Quadrature Phase Shift Keying (QPSK) modulation are done. With 2 or 4 transmit antennas, Space-Frequency Block-Code (SFBC) or SFBC- Frequency Switching Transmit Diversity (FSTD) encoding is, respectively, added, and the symbol sequence is finally mapped to the corresponding tones in the preamble, and goes through the OFDM modulator.

In various embodiments, the BS physical broadcast channel modules 312, 332 can be configured to perform one or more aspects of the methods and/or the embodiments generally described herein. In some embodiments, BS physical broadcast channel modules 312, 332 can include one or more systems or electrical components thereof.

The UEs 303, 323 can include transceivers 314, 334, processors 316, 336, and memory 318, 338, respectively, for respectively transmitting and receiving, processing and storing data and/or control information described herein. UEs 303, 323 can also include PBCH decoding modules 320, 330.

The PBCH decoding modules 320, 330 can be configured to perform one or more steps of methods 400, 450, 500, 600 and/or the embodiments described generally herein. In some embodiments, PBCH decoding modules 320, 330 can include one or more systems 800 or 820 or electrical components thereof.

In some embodiments, the PBCH decoding modules 320, 330 can be configured to perform blind decoding and/or hypothesis testing, as described herein. To improve reliability and reduce false alarms, embodiments described herein can provide a PBCH decoding module 320, 330 such as that described below with reference to FIG. 3A. The PBCH decoding module 320, 330 can be configured to be robust to a strong interference environment.

In one embodiment, the PBCH decoding module 320, 330 can be configured to perform channel decoding. In some aspects, a blind decoding to detect a frame boundary can be performed for the initial acquisition of PBCH. For instance, when acquiring PBCH for the first time, the number of transmit antennas may be unknown and thus blind decoding may be performed. In some cases, multiple hypotheses may be tested for the blind decoding of PBCH (e.g., 4 hypotheses for frame boundary (RV 0, 1, 2, or 3) times 3 hypotheses for the number of transmit antennas (1, 2, or 4) for a total of 12 decoding hypotheses).

Figure 3B:
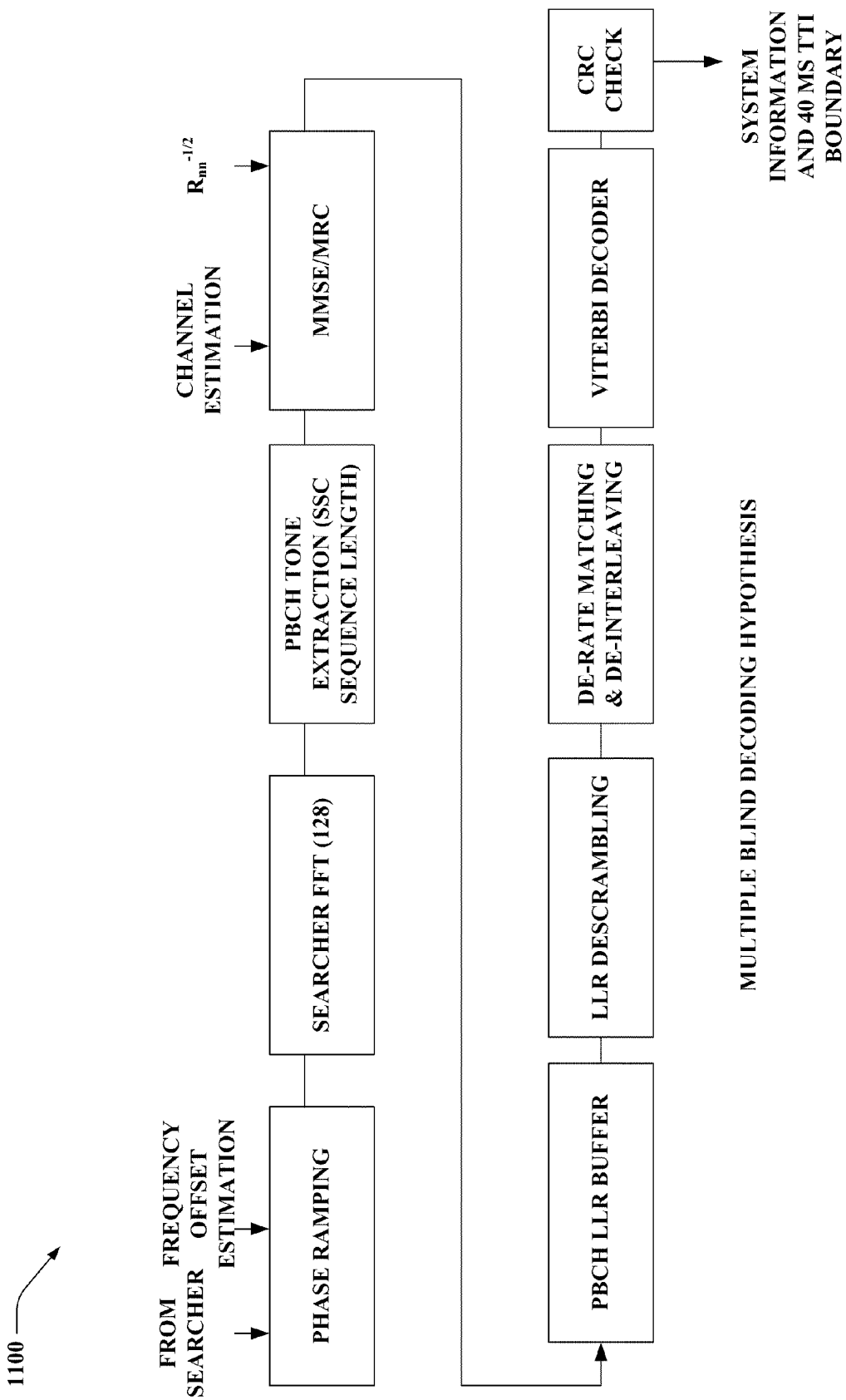

FIG. 3B illustrates an exemplary operation of a PBCH decoding module 320, 330 wherein initial acquisition of front end samples comes from a searcher sample server and blind decoding with 12 hypotheses is performed. After completing the initial acquisition of PBCH, an active mode may be entered. When the front-end samples have been collected for PBCH processing, PBCH data tones may be extracted and fed into MMSE/MRC block. Using the channel and interference covariance estimates, MMSE/MRC block can perform MRC combining in conjunction with SFBC or SFBC-FSTD decoding if there are multiple transmit antennas. After calculating Log Likelihood Ratio (LLR) of each bit, the LLR descrambling can be performed, and the LLRs for the same codeword bit may be combined together via a de-rate matching process. The de-interleaved codeword can be fed into the Viterbi decoder and the original information bits are recovered after CRC check and removal.

With regard to spatial processing in MMSE/MRC operation, there may be three possibilities for the number of transmit antennas: 1, 2, and 4, to be identified by testing hypotheses in blind detection process. Each hypothesis may involve a different MMSE/MRC operation. For simplicity, a UE with two receive antennas is assumed.

One transmit antenna: With only one transmit antenna, the receiver may perform simple MRC combining on the received signals from each receive antenna after noise whitening. First, r[k], the received signal vector on tone k, is expressed as $$r[k] = \begin{bmatrix} r_1[k] \\ r_2[k] \end{bmatrix} = \begin{bmatrix} h_1[k] \\ h_2[k] \end{bmatrix} S + \begin{bmatrix} n_1[k] \\ n_2[k] \end{bmatrix} \quad \text{Eqn. 1}$$

Let the interference covariance matrix be denoted by $R_{nn}$, which is provided by the interference estimator block. After multiplying the noise whitening matrix $R_{nn}^{-1/2}$, the received signal vector becomes $\tilde{r}[k]=R_{nn}^{-1/2}r[k]$. Denote the estimated channel gain for antenna 1 and tone k by $\hat{h}_i[k]$. Then, the effective estimated channel vector after the noise whitening, $\tilde{h}[k]$, becomes $$\tilde{h}[k] = \begin{bmatrix} \tilde{h}_1[k] \\ \tilde{h}_2[k] \end{bmatrix} = R_{nn}^{-1/2} \begin{bmatrix} \hat{h}_1[k] \\ \hat{h}_2[k] \end{bmatrix} \quad \text{Eqn. 2}$$

Finally, the MRC combining is performed to result in the following signals.

$$z[k]=\tilde{h}[k]^H \tilde{r}[k] \quad \text{Eqn. 3}$$

Figure 3C:
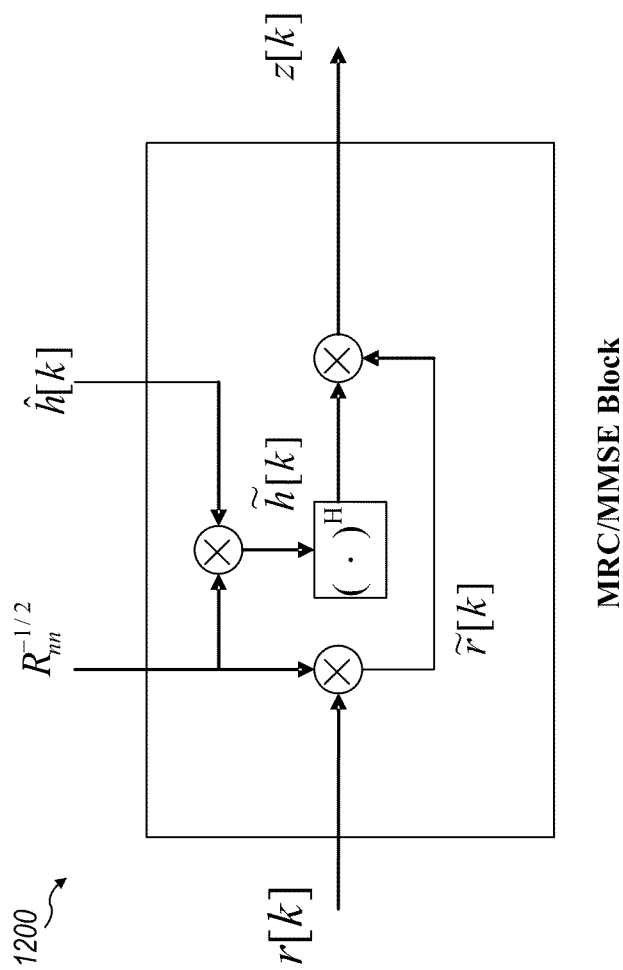

And the SNR after MRC combining is $|\tilde{h}_1[k]|^2+|\tilde{h}_2[k]|^2$. The block diagram for MMSE/MRC operation with 1 transmit antenna is illustrated at FIG. 3C.

Summary of MRC procedure with 1 transmit antenna is as follows. For tone k,
- Multiply noise whitening matrix, $R_{nn}^{-1/2}$ to the received signal vector, r[k]
- Multiply noise whitening matrix, $R_{nn}^{-1/2}$ to the estimated channel vector, $\hat{h}[k]$
- Take the inner product of effective estimated channel vector, $\tilde{h}[k]$ and the whitened received signal vector, $\tilde{r}[k]$ Two transmit antennas: 2 by 2 SFBC: With two transmit antennas, SFBC is utilized for PBCH transmission to achieve the open loop transmit diversity. Based on 2 by 2 SFBC encoding, two coded symbols are sent over two transmit antennas using two consecutive frequency tones as shown below $$\begin{bmatrix} S_1 & S_2 \\ -S_2^* & S_1^* \end{bmatrix} \begin{matrix} \leftarrow \text{Antenna 1} \\ \leftarrow \text{Antenna 2} \end{matrix}$$
$$\uparrow \quad \uparrow$$
$$f(k) \quad f(k+1)$$

The following vector R[k] is built from the received signal on tone k and k+1.

$$R[k] = \begin{bmatrix} r[k] \\ r[k+1] \end{bmatrix} = \begin{bmatrix} r_1[k] \\ r_2[k] \\ r_1^*[k+1] \\ r_2^*[k+1] \end{bmatrix} = \quad \text{Eqn. 4}$$

$$\begin{bmatrix} H_{11}[k] & H_{12}[k] \\ H_{21}[k] & H_{22}[k] \\ H_{12}^*[k+1] & -H_{11}^*[k+1] \\ H_{22}^*[k+1] & -H_{21}^*[k+1] \end{bmatrix} \begin{bmatrix} S_1 \\ -S_2^* \end{bmatrix} + \begin{bmatrix} n_1[k] \\ n_2[k] \\ n_1^*[k+1] \\ n_2^*[k+1] \end{bmatrix}$$

By assuming two consecutive tones have the same frequency response, $$H_{mn}[k+1]=H_{mn}[k] \text{ for } m,n=1 \text{ and } 2 \quad \text{Eqn. 5}$$

the vector R[k] becomes $$R[k] = \begin{bmatrix} r_1[k] \\ r_2[k] \\ r_1^*[k+1] \\ r_2^*[k+1] \end{bmatrix} = \begin{bmatrix} H_{11}[k] & H_{12}[k] \\ H_{21}[k] & H_{22}[k] \\ H_{12}^*[k] & -H_{11}^*[k] \\ H_{22}^*[k] & -H_{21}^*[k] \end{bmatrix} \begin{bmatrix} S_1 \\ -S_2^* \end{bmatrix} + \begin{bmatrix} n_1[k] \\ n_2[k] \\ n_1^*[k+1] \\ n_2^*[k+1] \end{bmatrix} \quad \text{Eqn. 6}$$

The noise covariance matrix is $$E\left\{ \begin{bmatrix} n_1[k] \\ n_2[k] \\ n_1^*[k+1] \\ n_2^*[k+1] \end{bmatrix} \cdot \begin{bmatrix} n_1[k] \\ n_2[k] \\ n_1^*[k+1] \\ n_2^*[k+1] \end{bmatrix}^H \right\} = \begin{bmatrix} R_{nn}^{(2\times2)} & 0^{(2\times2)} \\ 0^{(2\times2)} & R_{nn}^{(2\times2)} \end{bmatrix} \quad \text{Eqn. 7}$$

After multiplying the noise whitening filter $R_{nn}^{-1/2}$, the result is $$\tilde{r}[k] = \begin{bmatrix} \tilde{r}_1[k] \\ \tilde{r}_2[k] \end{bmatrix} = R_{nn}^{-1/2} \begin{bmatrix} r_1[k] \\ r_2[k] \end{bmatrix}, \quad \text{Eqn. 8}$$

$$\tilde{r}[k+1] = \begin{bmatrix} \tilde{r}_1[k+1] \\ \tilde{r}_2[k+1] \end{bmatrix} = R_{nn}^{-1/2} \begin{bmatrix} r_1[k+1] \\ r_2[k+1] \end{bmatrix}$$

and the effective estimated channel matrix after the whitening becomes $$\tilde{h}_1[k] = \begin{bmatrix} \tilde{h}_{11}[k] \\ \tilde{h}_{21}[k] \end{bmatrix} = R_{nn}^{-1/2} \begin{bmatrix} \hat{H}_{11}[k] \\ \hat{H}_{21}[k] \end{bmatrix}, \quad \text{Eqn. 9}$$

$$\tilde{h}_2[k] = \begin{bmatrix} \tilde{h}_{12}[k] \\ \tilde{h}_{22}[k] \end{bmatrix} = R_{nn}^{-1/2} \begin{bmatrix} \hat{H}_{12}[k] \\ \hat{H}_{22}[k] \end{bmatrix}$$

$$\text{Define } H_{SFBC}[k] = \begin{bmatrix} H_{11}[k] & H_{12}[k] \\ H_{21}[k] & H_{22}[k] \\ H_{12}^*[k] & -H_{11}^*[k] \\ H_{22}^*[k] & -H_{21}^*[k] \end{bmatrix},$$

$$\tilde{H}_{SFBC}[k] = \begin{bmatrix} \tilde{h}_{11}[k] & \tilde{h}_{12}[k] \\ \tilde{h}_{21}[k] & \tilde{h}_{22}[k] \\ \tilde{h}_{12}^*[k] & -\tilde{h}_{11}^*[k] \\ \tilde{h}_{22}^*[k] & -\tilde{h}_{21}^*[k] \end{bmatrix}, \text{ and}$$

-continued $$\tilde{R}[k] = \begin{bmatrix} \tilde{r}[k] \\ \tilde{r}^*[k+1] \end{bmatrix}.$$

Then, after performing MRC by multiplying $\tilde{H}_{SFBC}{}^H[k]$ to $\tilde{R}[k]$, the following equations are obtained.

Equlized symbol for $S_1$: $\tilde{h}_1{}^H[k] \cdot \tilde{r}[k] + (\tilde{h}_2{}^H[k])^* \cdot \tilde{r}^*[k+1]$  Eqn. 10

Post-Equalization SNR for $S_1$: $|\tilde{h}_1[k]|^2 + |\tilde{h}_2[k]|^2$  Eqn. 11

Equlized symbol for $S_2$: $\tilde{h}_1{}^H[k] \cdot \tilde{r}[k+1] - (\tilde{h}_2{}^H[k])^* \cdot \tilde{r}^*[k]$  Eqn. 12

Post-Equalization SNR for $S_2$: $|\tilde{h}_1[k]|^2 + |\tilde{h}_2[k]|^2$  Eqn. 13

Figure 3D:
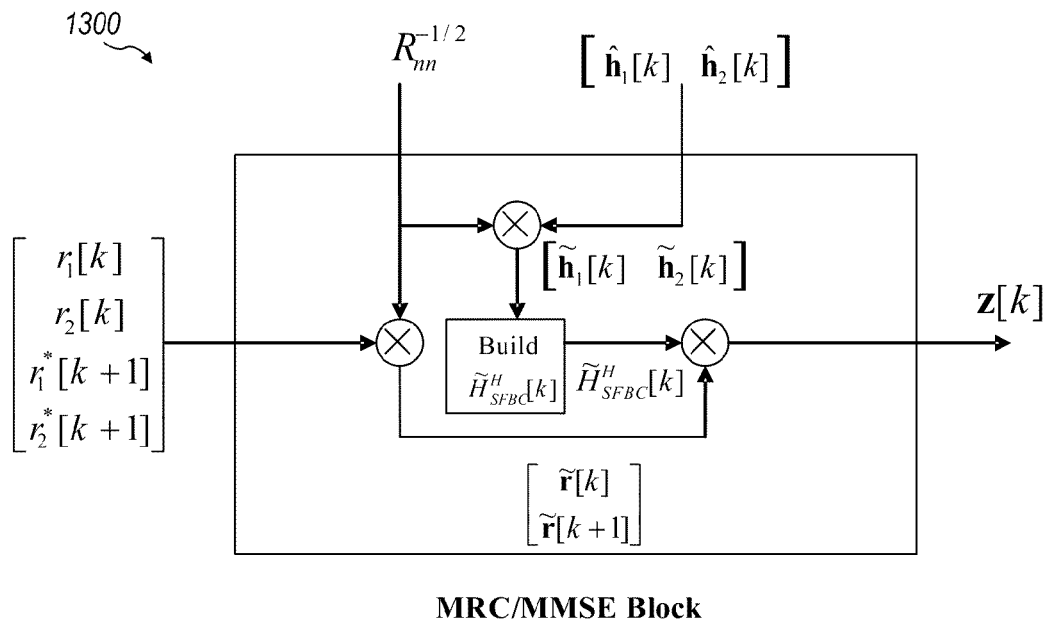

The block diagram for MMSE/MRC with two transmit antennas is illustrated in FIG. 3D.

It should be noted that the second component of z[k] is $-S^*_2$ scaled by some positive number, rather than a scaled version of $S_2$. Thus, the minus conjugate operation is required for $z_2[k]$, before passing z[k] to the next receiver block. MMSE/MRC procedure with 2 transmit antennas can be summarized as follows: for tone k and k+1, Build the received vector R[k] from two consecutive tones Multiply noise whitening matrix, $R_{nn}^{-1/2}$ to the received signal vector, R[k]

Multiply noise whitening matrix, $R_{nn}^{-1/2}$ to the estimated channel vector, ĥ[k]

Build $\tilde{H}_{SFBC}{}^H[k]$ from the whitened estimated channel vector, ĥ[k]

Multiply $\tilde{H}_{SFBC}{}^H[k]$ to the whitened received signal vector $\tilde{R}[k]$ Take the minus conjugate on $z_2[k]$ Four transmit antennas: 4 by 2 SFBC-FSTD: With 4 transmit antennas, PBCH is delivered based on SFBC-FSTD to achieve the open loop transmit diversity. Four consecutive tones are grouped together for SFBC-FSTD transmission. For the pairs of tones with the indices 4k and 4k+1, only transmit antenna 0 and 2 are activated and the signals are sent by using SFBC through 2 by 2 MIMO channels formed by these two transmit antennas. On the other hand, for the pairs of tones with the indices 4k+2 and 4k+3, transmit antenna 1 and 3 are enabled, and SFBC is applied to send data through 2 by 2 MIMO channels. Since only the half number of tones on each transmit antenna conveys data, the transmit power on the enabled tones can be doubled while satisfying the per antenna power constraint.

|  | → Tone indices | | | |
|---|---|---|---|---|
| Ant 0 | $S_1$ | $S_2$ | 0 | 0 |
| Ant 1 | 0 | 0 | $S_3$ | $S_4$ |
| Ant 2 | $-S_2^*$ | $S_1^*$ | 0 | 0 |
| Ant 3 | 0 | 0 | $-S_4^*$ | $S_3^*$ |

The above matrix illustrates the operation of SFBC-FSTD. Each row denotes the transmit antenna, and the columns are mapped to tones. The above pattern is repeated across all the tones.

Figure 3E:
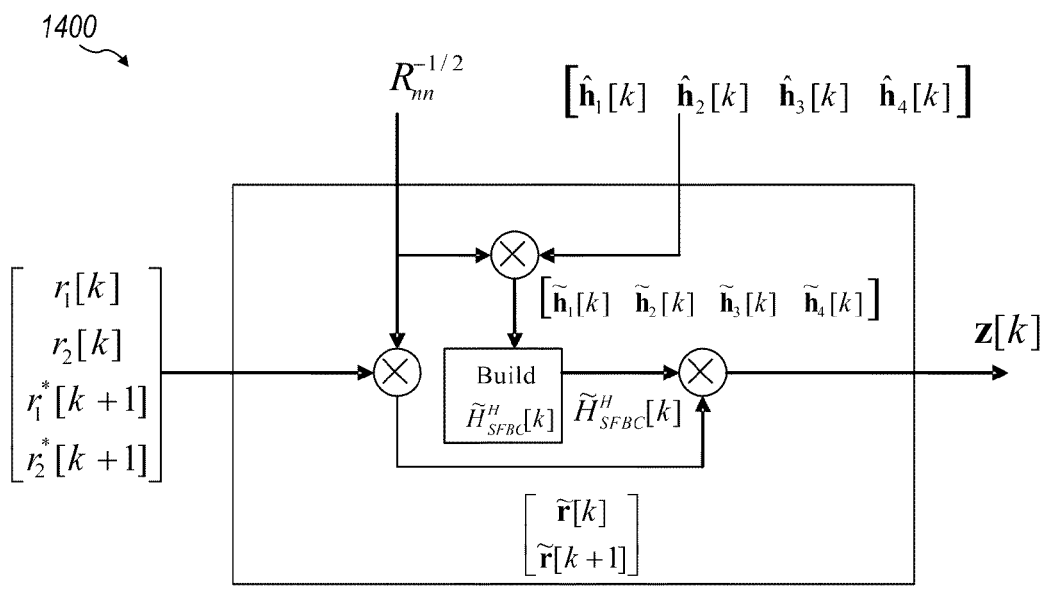

The block diagram for MMSE/MRC with 4 transmit antennas is illustrated at FIG. 3E.
In this figure, $$\tilde{H}_{SFBC}[k] = \begin{bmatrix} \tilde{h}_{11}[k] & \tilde{h}_{13}[k] \\ \tilde{h}_{31}[k] & \tilde{h}_{33}[k] \\ \tilde{h}_{13}^*[k] & -\tilde{h}_{11}^*[k] \\ \tilde{h}_{33}^*[k] & -\tilde{h}_{31}^*[k] \end{bmatrix} \text{ if } k = 4n; \text{ else if } k = 4n+2,$$

$$\tilde{H}_{SFBC}[k] = \begin{bmatrix} \tilde{h}_{22}[k] & \tilde{h}_{24}[k] \\ \tilde{h}_{42}[k] & \tilde{h}_{44}[k] \\ \tilde{h}_{24}^*[k] & -\tilde{h}_{22}^*[k] \\ \tilde{h}_{44}^*[k] & -\tilde{h}_{42}^*[k] \end{bmatrix}.$$

MMSE/MRC procedure with 4 transmit antennas can be summarized as the following.

For the pairs of tones with the indices 4k and 4k+1: perform the same procedure as SFBC using TX antenna 0 and 2;

For the pairs of tones with the indices 4k+2 and 4k+3: perform the same procedure as SFBC using TX antenna 1 and 3.

Channel De-scrambling: The LLRs are de-scrambled by the pre-determined random sequence before going through de-rate matching and de-interleaving. Pseudo-random sequences for PBCH scrambling/descrambling are defined by a length-31 Gold sequence. The output sequence c(n) of length $M_{PN}$, where n=0, 1, . . . , $M_{PN}$−1, is defined by $c(n) = (x_1(n+N_C) + x_2(n+N_C)) \mod 2$ $x_1(n+31) = (x_1(n+3) + x_1(n)) \mod 2$ $x_2(n+31) = (x_2(n+3) + x_2(n+2) + x_2(n+1) + x_2(n)) \mod 2$ where $N_C = 1600$ and the first m-sequence shall be initialized with $x_1(0) = 1$, $x_1(n) = 0$, n=1,2, . . . , 30. The initialization of the second m-sequence for PBCH scrambling is denoted by $c_{init} = N_{ID}^{Cell}$. The descrambling operation is to multiply '−1' to each LLR if the corresponding output from the sequence generator is equal to '1'. The channel rate matching and interleaving operations for PBCH are explained below. In another aspect, de-rate matching and de-interleaving operations for PBCH are described in detail.

With regard to de-rate matching, the de-scrambled LLR sequence with the length of E can enter a de-rate matching block. The value of E may be related to the hypothesis being tested for blind decoding. Denote each LLR of this input sequence by $e_k$, k=0, 1, . . . , E−1. Since $e_k$ includes the repeated versions of the interleaved codeword with the length of $K_w$, the first operation in de-rate matching is to combine the multiple LLRs coming from the same codeword bit. If the combined LLR sequence is denoted by $w_k$, k=0, 1, . . . , $K_w$−1, the combining procedure can be described as follows.

```
Set k = 0
while { k < E }
    w_{k mod K_w} = w_{k mod K_w} + e_k
    k = k + 1
end while
```

The combined LLR sequence is written on the circular buffer with the same length, and de-multiplexed into three different bit sequences of length $K_\Pi = 1/3 K_w$, which are denoted by $v_0^{(l)}, v_1^{(l)}, v_2^{(l)}, \ldots, v_{K_\Pi-1}^{(l)}$, l=0, 1, 2. These sequences satisfy the following relations.

$$v_k^{(0)} = w_k \text{ for } k=0, \ldots, K_\Pi-1$$

$$v_k^{(1)} = w_{K_\Pi+k} \text{ for } k=0, \ldots, K_\Pi-1$$

$$v_k^{(2)} = w_{2K_\Pi+k} \text{ for } k=0, \ldots, K_\Pi-1$$

Finally, each LLR stream can be fed into the sub-block de-interleaver. The overall operation of de-rate matching block is shown at FIG. 3F.

Figure 3F:
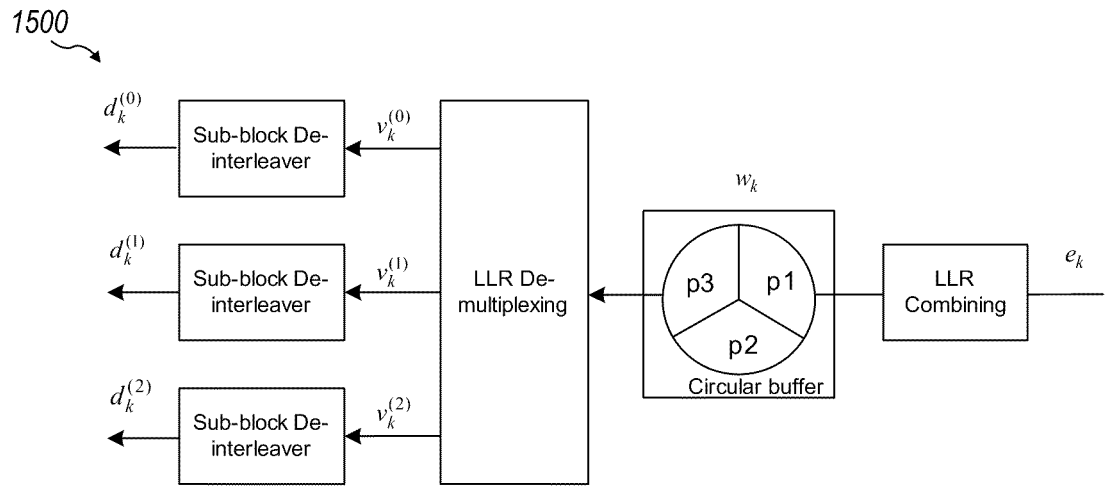

With regard to sub-block de-interleaver, the sub-block interleaver in FIG. 3F has the input sequence of combined LLR defined as $v_0^{(l)}, v_1^{(l)}, v_2^{(l)}, \ldots, v_{K_\Pi-1}^{(l)}$, and the output stream $d_k^{(l)}$ where l=0, 1, 2. Then, the reverse operation to the sub-block interleaving is performed as follows:

(a) Build an R×C matrix such that R×C>$K_\Pi$ as below. The number of columns in this matrix, C is 32, and the permutation function P is defined in the previous subsection. Then, $N_D = (R \times C - K_\Pi)$ dummy bits are inserted at the first row such that $y_k = <\text{NULL}>$ for $k=0, 1, \ldots, N_D-1$.

$$\begin{bmatrix} y_{P(0)} & y_{P(1)} & y_{P(2)} & \cdots & y_{P(C-1)} \\ y_{P(0)+C} & y_{P(1)+C} & y_{P(2)+C} & \cdots & y_{P(C-1)+C} \\ \vdots & \vdots & \vdots & \ddots & \vdots \\ y_{P(0)+(R-1)\times C} & y_{P(1)+(R-1)\times C} & y_{P(2)+(R-1)\times C} & \cdots & y_{P(C-1)+(R-1)\times C} \end{bmatrix}$$

(b) Write the input bit sequence, $v_0^{(l)}, v_1^{(l)}, v_2^{(l)}, \ldots, v_{K_\Pi-1}^{(l)}$ into the R×C matrix column by column starting with bit $y_{P(0)}$ in column 0 of row 0. If there is a dummy bit, the input bit is written in the $2^{nd}$ row instead of replacing the dummy bit.

(c) Then, perform the inter-column permutation for the matrix based on the pattern $\langle P^{-1}(j) \rangle_{j \in \{0, 1, \ldots, C-1\}}$ that is shown in TABLE 1, where $P^{-1}(j)$ is the original column position of the j-th permuted column. After permutation of the columns, the inter-column permuted R×C matrix is equal to $$\begin{bmatrix} y_0 & y_1 & y_2 & \cdots & y_{C-1} \\ y_C & y_{C+1} & y_{C+2} & \cdots & y_{2C-1} \\ \vdots & \vdots & \vdots & \ddots & \vdots \\ y_{(R-1)\times C} & y_{(R-1)\times C+1} & y_{(R-1)\times C+2} & \cdots & y_{(R\times C-1)} \end{bmatrix}$$

(d) Denote $N_D = (R \times C - K_\Pi)$ and read the output stream from the above matrix such that $d_k^{(l)} = y_{N_D+k}$, $k=0, 1, \ldots, K_\Pi-1$.

TABLE 1 depicts inter-column permutation pattern for sub-block de-interleaver:

TABLE 1

| Number of columns C | Inter-column permutation pattern<br>$<P^{-1}(0), P^{-1}(1), \ldots, P^{-1}(C-1)>$ |
|---|---|
| 32 | <16, 0, 24, 8, 20, 4, 28, 12, 18, 2, 26, 10, 22, 6, 30, 14, 17, 1, 25, 9, 21, 5, 29, 13, 19, 3, 27, 11, 23, 7, 31, 15> |

The output LLR streams $d_k^{(l)}$ where l=0, 1, 2 are fed into tail-biting decoder.

In particular, with regard to blind decoding, the PBCH can have a 40 ms transmission time interval (TTI), but only a 10 ms radio frame boundary may be known before PBCH decoding. Therefore, in order to decode the first PBCH frame, the PBCH decoding modules 320, 330 can perform blind decoding of the PBCH assuming four different TTI boundaries:

(a) assume the current radio frame corresponds to RV0, which means the first radio frame of 40 ms TTI: the log likelihood ratios (LLRs) in RV0 are combined;

(b) assume the current radio frame corresponds to RV1, which means the second radio frame of 40 ms TTI: LLRs in RV0 and RV1 are combined;

(c) assume the current radio frame corresponds to RV2, which means the third radio frame of 40 ms TTI: LLRs in RV0, RV1, and RV2 are combined; and (d) assume the current radio frame corresponds to RV3, which means the last radio frame of 40 ms TTI: LLRs in RV0, RV1, RV2, and RV3 are combined.

Also, the number of transmit antenna is carried on PBCH; thus, when decoding the first PBCH frame, that information is unknown, which requires the blind decoding assuming three different hypotheses on the number of transmit antennas: 1, 2, or 4.

Therefore, in order to decode the first PBCH packet, blind decoding with 12 total hypotheses needs to be performed at each 10 ms radio frame. Each hypothesis is sequentially tested until CRC is passed. If CRC fails after testing every 12 hypothesis, the testing starts again from the first hypothesis. Note that each frame boundary hypothesis generates the different number of LLRs as listed in TABLE 2. LLRs are sequentially stored in a circular buffer with the size of 480*4=1920 bits. If CRC fails after testing all 12 hypotheses, LLRs from the new radio frame overwrite the oldest 480 LLRs in the circular buffer.

TABLE 2 lists hypotheses for PBCH blind decoding:

TABLE 2

| Hypothesis | TTI boundary | Decoded RVs | # of LLRs |
|---|---|---|---|
| 1 | RV0 | RV0 | 480 |
| 2 | RV1 | RV0 + RV1 | 960 |
| 3 | RV2 | RV0 + RV1 + RV2 | 1440 |
| 4 | RV3 | RV0 + RV1 + RV2 + RV3 | 1920 |
| Total | | | 4800 |

Figure 3G:
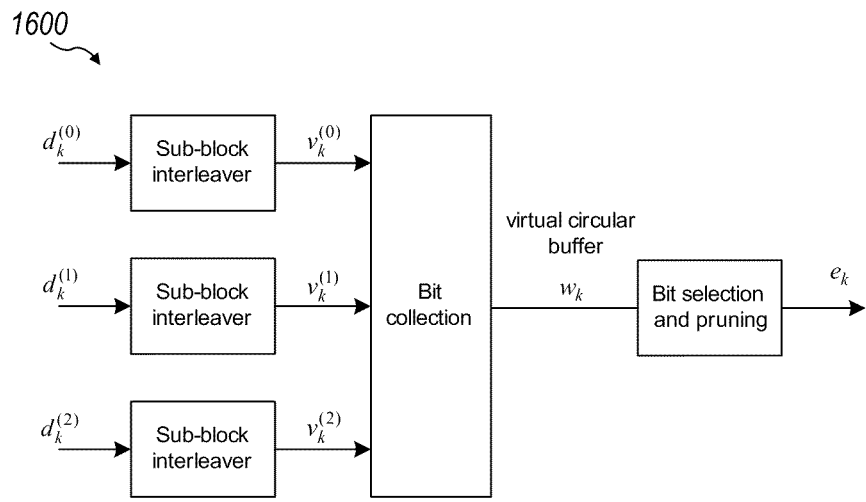

The rate matching for PBCH includes interleaving the three bit streams, $d_k^{(0)}, d_k^{(1)}$ and $d_k^{(2)}$, followed by the collection of bits and the generation of a circular buffer as depicted in FIG. 3G.

The bit stream $d_k^{(l)}$ where l=0, 1, 2 is interleaved according to the sub-block interleaver with an output sequence defined as $v_0^{(l)}, v_1^{(l)}, v_2^{(l)}, \ldots, v_{K_\Pi-1}^{(l)}$. The sub-block interleaver includes bits input to a matrix with padding, the inter-column permutation for the matrix and bits output from the matrix. The bits input to the block interleaver are denoted by $d_0^{(i)}, d_1^{(i)} d_2^{(i)}, \ldots, d_{D-1}^{(i)}$, where D is the number of bits. The output bit sequence from the block interleaver is derived as follows:

(a) Assign C=32 to be the number of columns of the matrix. The columns of the matrix are numbered 0, 1, 2, ..., C−1 from left to right.

(b) Determine the number of rows of the matrix, R, by finding minimum integer R such that $K_\Pi \leq (R \times C)$. The rows of rectangular matrix are numbered 0, 1, 2, ..., R−1 from top to bottom.

(c) If R×C>D, then $N_D = (R \times C - D)$ dummy bits are padded such that $y_k = <\text{NULL}>$ for $k=0, 1, \ldots, N_D-1$. Then, write the input bit sequence, i.e., $y_{N_D+k}=d_k^{(i)}$, $k=0, 1, \ldots, D-1$, into the R×C matrix row by row starting with bit $y_0$ in column 0 of row 0:

$$\begin{bmatrix} y_0 & y_1 & y_2 & \cdots & y_{C-1} \\ y_C & y_{C+1} & y_{C+2} & \cdots & y_{2C-1} \\ \vdots & \vdots & \vdots & \ddots & \vdots \\ y_{(R-1)\times C} & y_{(R-1)\times C+1} & y_{(R-1)\times C+2} & \cdots & y_{(R\times C-1)} \end{bmatrix}$$

(d) Perform the inter-column permutation for the matrix based on the pattern $\langle (P(j)) \rangle_{j\in\{0, 1, \ldots, C-1\}}$ that is shown in TABLE 3, where P(j) is the original column position of the j-th permuted column. After permutation of the columns, the inter-column permuted R×C matrix is equal to $$\begin{bmatrix} y_{P(0)} & y_{P(1)} & y_{P(2)} & \cdots & y_{P(C-1)} \\ y_{P(0)+C} & y_{P(1)+C} & y_{P(2)+C} & \cdots & y_{P(C-1)+C} \\ \vdots & \vdots & \vdots & \ddots & \vdots \\ y_{P(0)+(R-1)\times C} & y_{P(1)+(R-1)\times C} & y_{P(2)+(R-1)\times C} & \cdots & y_{P(C-1)+(R-1)\times C} \end{bmatrix}$$

(e) The output of the block interleaver is the bit sequence read out column by column from the inter-column permuted R×C matrix. The bits after sub-block interleaving are denoted by $v_0^{(i)}, v_1^{(i)}, v_2^{(i)}, \ldots, v_{K_\Pi-1}^{(i)}$ where $v_0^{(i)}$ corresponds to $y_{P(0)}, v_1^{(i)}$ to $y_{P(0)+C}, \ldots$. If any, the dummy bits at the first row are skipped and not included in the interleaved bits.

TABLE 3 depicts inter-column permutation pattern for sub-block interleaver:

TABLE 3

| Number of columns C | Inter-column permutation pattern <P(0), P(1), ..., P(C − 1)> |
|---|---|
| 32 | <1, 17, 9, 25, 5, 21, 13, 29, 3, 19, 11, 27, 7, 23, 15, 31, 0, 16, 8, 24, 4, 20, 12, 28, 2, 18, 10, 26, 6, 22, 14, 30> |

After the interleaving operation, the circular buffer of length $K_w=3K_\Pi$ is generated as follows:

$w_k=v_k^{(0)}$ for $k=0, \ldots, K_\Pi-1$ $w_{K_\Pi+k}=v_k^{(1)}$ for $k=0, \ldots, K_\Pi-1$ $w_{2K_\Pi+k}=v_k^{(2)}$ for $k=0, \ldots, K_\Pi-1$ Denoting by E the rate matching output sequence length for this coded block, the rate matching output bit sequence is $e_k$, $k=0, 1, \ldots, E-1$.

```
Set k = 0 and j = 0
while { k < E }
    if w_{j mod K_w} ≠ < NULL >
        e_k = w_{j mod K_w}
        k = k + 1
    j = j + 1
    else
    j = j + 1
    end if
end while
```

Figure 4A:
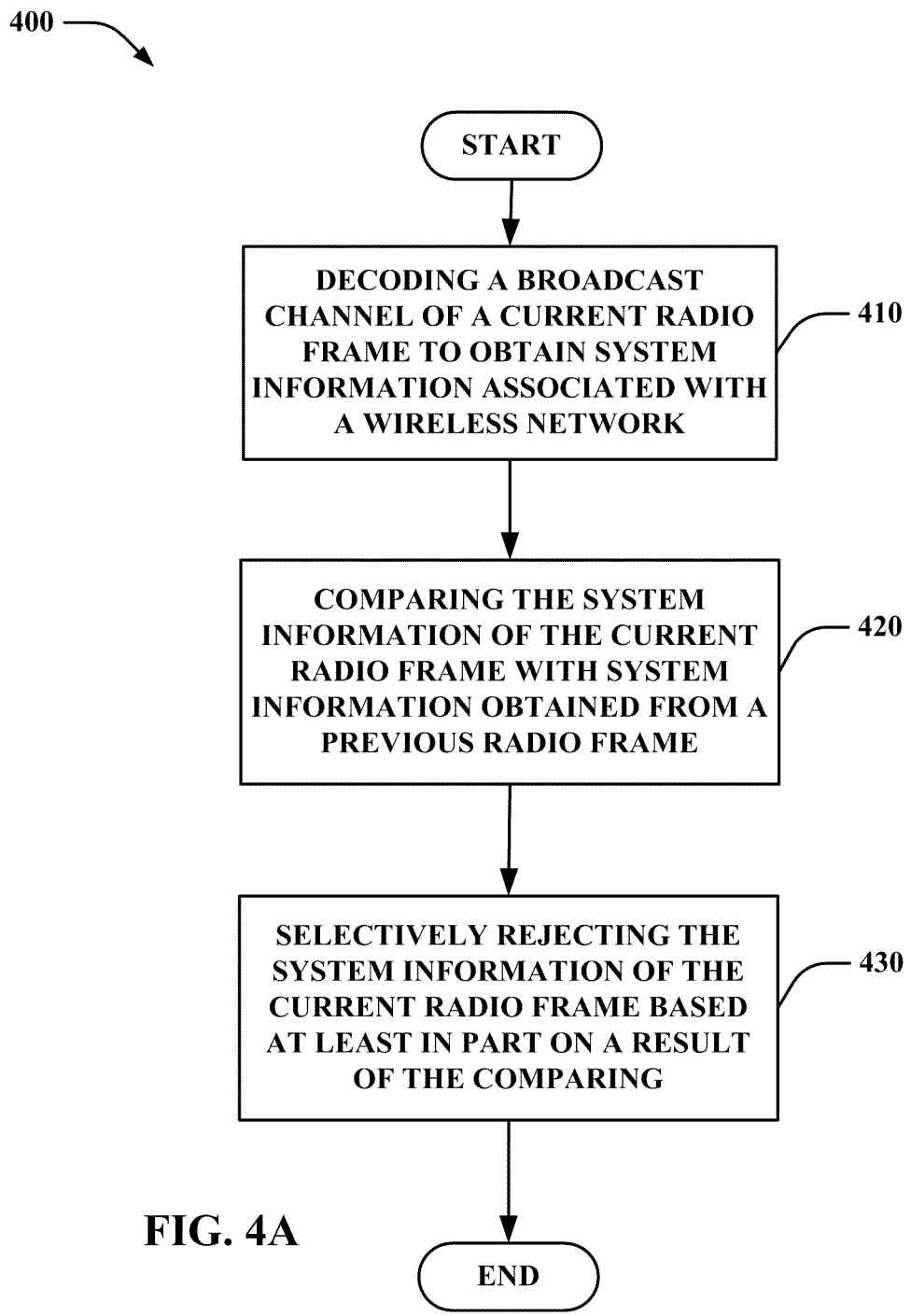
FIGS. 4A and 4B are flowcharts of exemplary processes relating to reliable channel decoding in accordance with various aspects set forth herein.
Figure 4B:
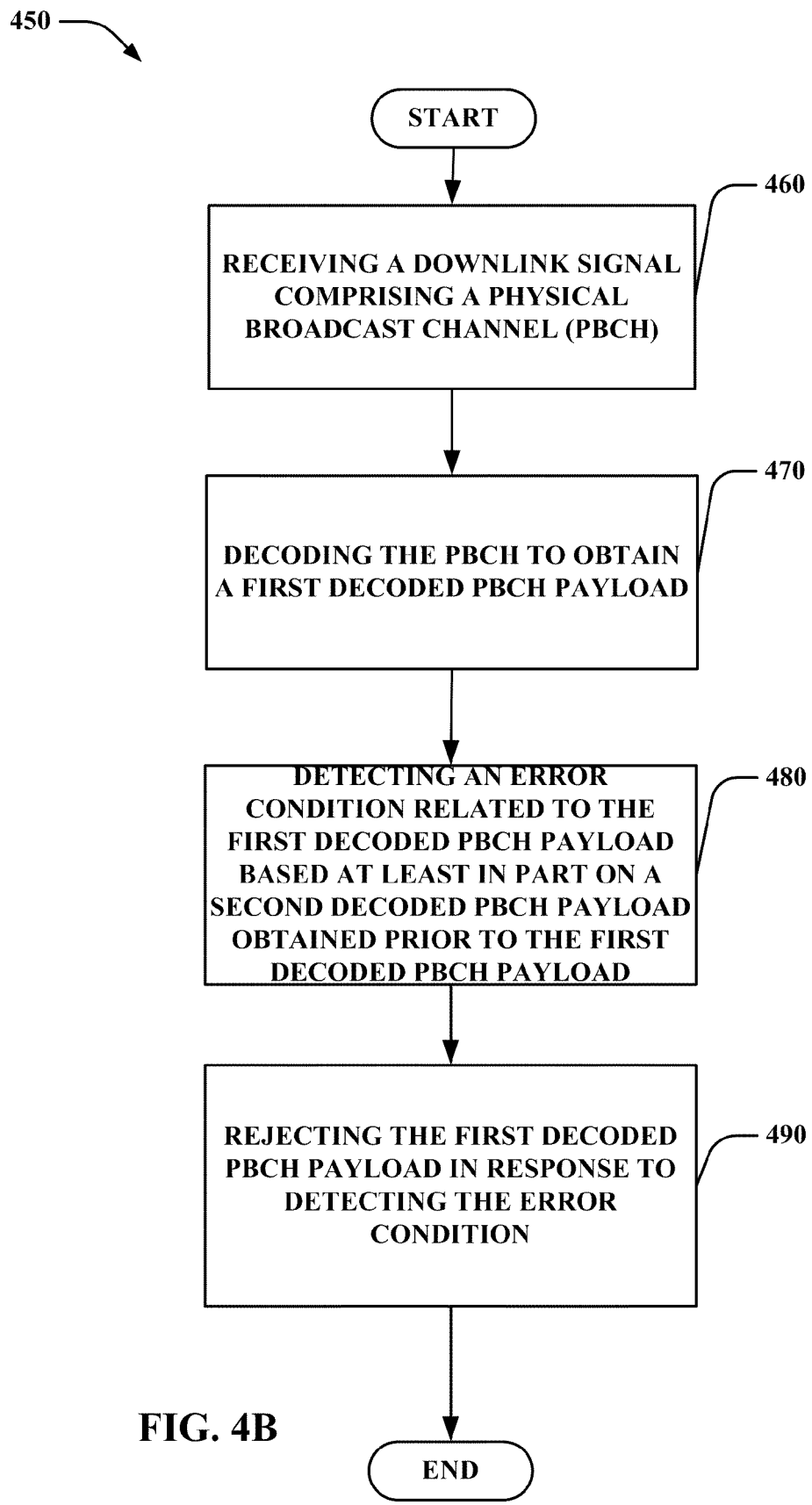

FIGS. 4A and 4B flowcharts of exemplary methods that the PBCH decoding modules 320, 330 of FIG. 3 may perform for reliable channel decoding in accordance with various aspects set forth herein. In some embodiments, the method 400 can include decoding 410 a broadcast channel of a current radio frame to obtain system information associated with a wireless network. Decoding the broadcast channel can include testing a plurality of hypotheses in some embodiments.

The method 400 can also include comparing 420 the system information of the current radio frame with system information obtained from a previous radio frame. In some embodiments, the comparison is initiated in response to passing a cyclic redundancy check (CRC) associated with decoding the broadcast channel. The method 400 can also include selectively rejecting 430 the system information of the current radio frame based at least in part on a result of the comparing.

In some embodiments, the system information comprises a bandwidth (BW) indicator, and the system information of the current radio frame is rejected when the BW indicator of the current radio frame does not match a BW indicator of the previous radio frame. In some embodiments, the system information from the current radio frame is selectively rejected based at least in part on an system frame number (SFN) associated with the previous frame.

In some embodiments, the system information comprises an RV index and comparing the system information of the current frame with the system information from a previous radio frame includes comparing a first RV index associated with the current radio frame with an expected RV index determined from the previous radio frame. In this embodiment, the system information of the current radio frame can be rejected when the first RV does not match the expected RV.

Turning now to FIG. 4B, method 450 can include receiving 460 a downlink signal comprising a physical broadcast channel (PBCH).

The method 450 can also include decoding 470 the PBCH to obtain a first decoded PBCH payload. Decoding the PBCH can be performed until a successful cyclic redundancy check is achieved for the first decoded PBCH payload. In some embodiments, blind decoding is performed in accordance with a plurality of hypotheses.

The method 450 can also include detecting 480 an error condition related to the first decoded PBCH payload based at least in part on a second decoded PBCH payload obtained prior to the first decoded PBCH payload. In some embodiments, detecting the error condition includes determining that a BW field associated with the first decoded PBCH payload does not match a BW field associated with the second decoded PBCH payload. In some embodiments, detecting the error condition includes determining that the BW field associated with the first decoded payload and a reserved bit associated with the first decoded PBCH payload do not match a BW field associated with the second decoded PBCH payload and a reserved bit associated with the second decoded PBCH payload, respectively.

In some embodiments, detecting the error condition comprises determining a system frame number associated with the first decoded PBCH payload is indicative of an incorrect number of PBCH frames between a frame associated with the first decoded PBCH payload and a frame associated with the second decoded PBCH payload. In some embodiments, detecting the error condition includes determining that an RV index is of the current radio frame is inconsistent with an expectation for a known frame boundary for the PBCH. In some embodiments, detecting the error condition comprises determining a PCFICH value is inconsistent with an expected Physical Hybrid ARQ Indicator (PHICH) duration. For example, if the PCFICH value is known to be one or two, then a "normal" PHICH duration of one OFDM symbol may be expected. The method 450 can also include rejecting 490 the first decoded PBCH payload in response to detecting the error condition.

In some embodiments, decoding is performed over a plurality of radio frames and detecting an error condition related to the first decoded PBCH payload may include determining whether a cyclic redundancy check for the first decoded PBCH payload is acceptable during the decoding for a first one of the plurality of radio frames and whether an RV index associated with the first decoded PBCH payload is less than a selected value. This can include storing the first decoded PBCH payload in response to determining that the CRC for the first decoded PBCH payload is acceptable during the decoding of a first one of the plurality of radio frames. The method may also include determining whether a CRC for the first decoded PBCH payload is acceptable during the decoding of a second one of the plurality of radio frames that is received later in time than the first one of the plurality of radio frames.

In some embodiments, the method 450 can also include accepting (not shown) the first decoded PBCH payload in response to determining that the CRC for the first decoded PBCH payload is acceptable during the decoding for the second one of the plurality of radio frames, and conditions are met. The conditions may include determining an RV index associated with the first decoded PBCH payload is a value indicative of the selected value plus one (when the first one of the plurality of radio frames is immediately prior to the second one of the plurality of radio frames) and the first decoded PBCH payload matches the second decoded PBCH payload. For example, the RV index of successive radio frames might be expected to differ by one.

In some embodiments, the method 450 can also include discarding (not shown) the second decoded PBCH payload and storing the first decoded PBCH payload in response to determining that the CRC for the first decoded PBCH payload is acceptable during the decoding for the second one of the plurality of radio frames when conditions are not met. For example, discarding may include releasing memory locations and storing may include allocating memory locations. The conditions may include whether an RV index associated with the first decoded PBCH payload is a value indicative of the selected value plus one (when the first one of the plurality of radio frames is immediately prior to the second one of the plurality of radio frames) and whether the first decoded PBCH payload matches the second decoded PBCH payload.

In some embodiments, the method 450 can also include discarding (not shown) the first decoded PBCH payload in response to determining that the CRC for the first decoded PBCH payload is not acceptable during the decoding of the second one of the plurality of radio frames.

In some embodiments, decoding is performed over a plurality of radio frames. In that case, detecting an error condition related to the first decoded PBCH payload may include comparing a plurality of CRCs on preambles of a plurality of decoded payloads. The first decoded PBCH payload can be one of the plurality of decoded payloads. The method can also include selecting one or more decoded payloads associated with a largest number of CRC passes during decoding in response to determining that more than one of the plurality of decoded payloads are associated with CRC that are acceptable. The method can include selecting one of the acceptable payloads that is associated with a largest number of CRC passes and/or that is associated with a largest RV index.

Figure 5:
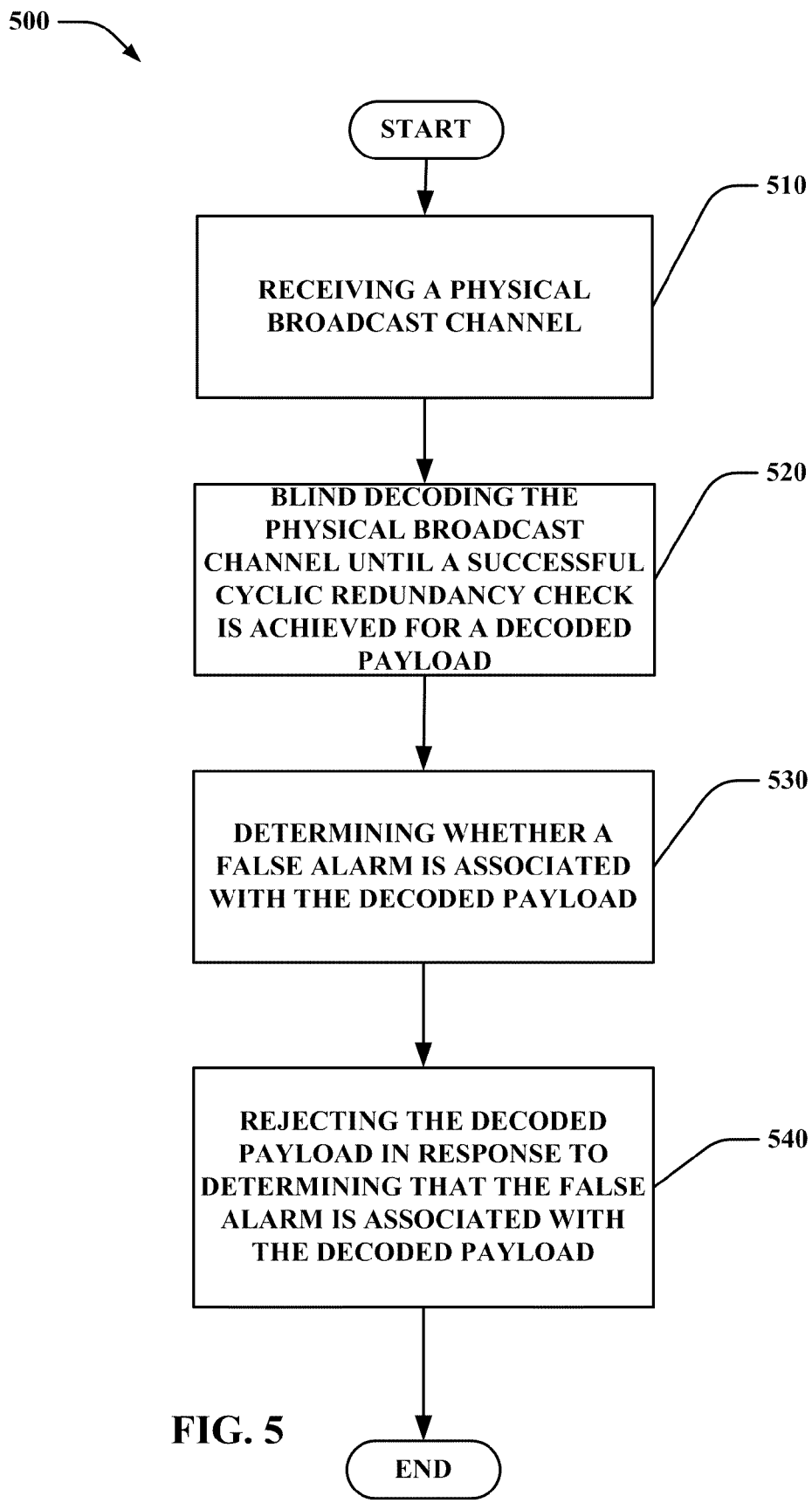
FIG. 5 is a flowchart of a further exemplary process for reliable channel decoding in accordance with various aspects set forth herein.

FIG. 5 is a flowchart of a method for reliable channel decoding in accordance with various aspects set forth herein.

At 510, method 500 can include receiving a downlink transmission comprising a physical broadcast channel. At 520, method 500 can include blind decoding the physical broadcast channel. In some embodiments, blind decoding the physical broadcast channel is performed until a successful cyclic redundancy check is achieved for a decoded payload and comprises comparing a previous successfully decoded payload with the decoded payload.

The blind decoding can be performed over a plurality of radio frames and may include determining whether a false alarm is associated with a decoded payload. This may include determining whether a CRC for a first decoded payload is acceptable during the blind decoding for a first one of the plurality of radio frames and whether an RV index associated with the first decoded payload is less than a selected value. The method may also include storing the first decoded payload in response to determining that the CRC for the first decoded payload is acceptable during the blind decoding for a first one of the plurality of radio frames and determining whether a CRC for the decoded payload is acceptable during the blind decoding for a second one of the plurality of radio frames. The second one of the plurality of radio frames can be received later in time than the first one of the plurality of radio frames.

In some embodiments, the selected value of the RV index can be a value less than 3. In some embodiments, the selected value can be at least one of 0, 1 or 2. In some embodiments, the selected value can be at least one of 1 or 2.

At 530, method 500 can include determining whether a false alarm is associated with the decoded payload. In some embodiments, determining whether a false alarm is associated with the decoded payload comprises identifying a violation condition. In some embodiments, the violation condition occurs when a first BW field associated with the previous successfully decoded payload is not identical to a second BW field associated with the decoded payload.

In some embodiments, the violation condition occurs when the first BW field associated with the previous successfully decoded payload and a first reserved bit associated with the previous successfully decoded payload are not identical to the second BW field associated with the decoded payload and a second reserved bit associated with the decoded payload, respectively.

In some embodiments, the violation condition occurs when a system frame number associated with the decoded payload is indicative of an incorrect number of physical broadcast channel frames between a frame associated with the decoded payload and a frame associated with the previous successfully decoded payload.

In some embodiments, the violation condition occurs when an RV index is inconsistent with an expectation for a known frame boundary for the physical broadcast channel.

In some embodiments, the violation condition occurs when a physical control format indicator channel (PCFICH) value is inconsistent with an expected physical HARQ indicator channel (PHICH) duration. In some embodiments, the PCFICH value is inconsistent when the PCFICH value is one or two and the PHICH duration is other than one OFDM symbol. For example, if the PCFICH value is known, and the physical control format indicator channel is 1 or 2, there should be a "normal" PHICH duration of one PHICH OFDM symbol. Otherwise, a violation condition may be detected.

At 540, method 500 can include rejecting the decoded payload in response to determining that the false alarm is associated with the decoded payload.

In some embodiments, method 500 can include a step (not shown) that includes accepting the decoded payload in response to determining that the CRC for the decoded payload is acceptable during the blind decoding for the second one of the plurality of radio frames and conditions are met. The conditions can include a condition where an RV index associated with the decoded payload has a value indicative of the selected value plus one (where the first one of the plurality of radio frames is immediately prior to the second one of the plurality of frames) and the decoded payload matches the first decoded payload.

In some embodiments, the selected value of the RV index can be a value less than 3. In some embodiments, the selected value can be at least one of 0, 1 or 2. In some embodiments, the selected value can be at least one of 1 or 2.

In some embodiments, method 500 can include a step (not shown) that includes discarding the first decoded payload and storing the decoded payload in response to determining that the CRC for the decoded payload is acceptable during the blind decoding for the second one of the plurality of radio frames and the conditions are not met. The conditions can include an RV index associated with the decoded payload is a value indicative of the selected value plus one (when the first one of the plurality of radio frames is immediately prior to the second one of the plurality of frames) and the decoded payload matches the first decoded payload.

In some embodiments, method 500 can include a step (not shown) that includes discarding the first decoded payload in response to determining that the CRC for the decoded payload is not acceptable during the blind decoding for the second one of the plurality of radio frames.

Figure 6:
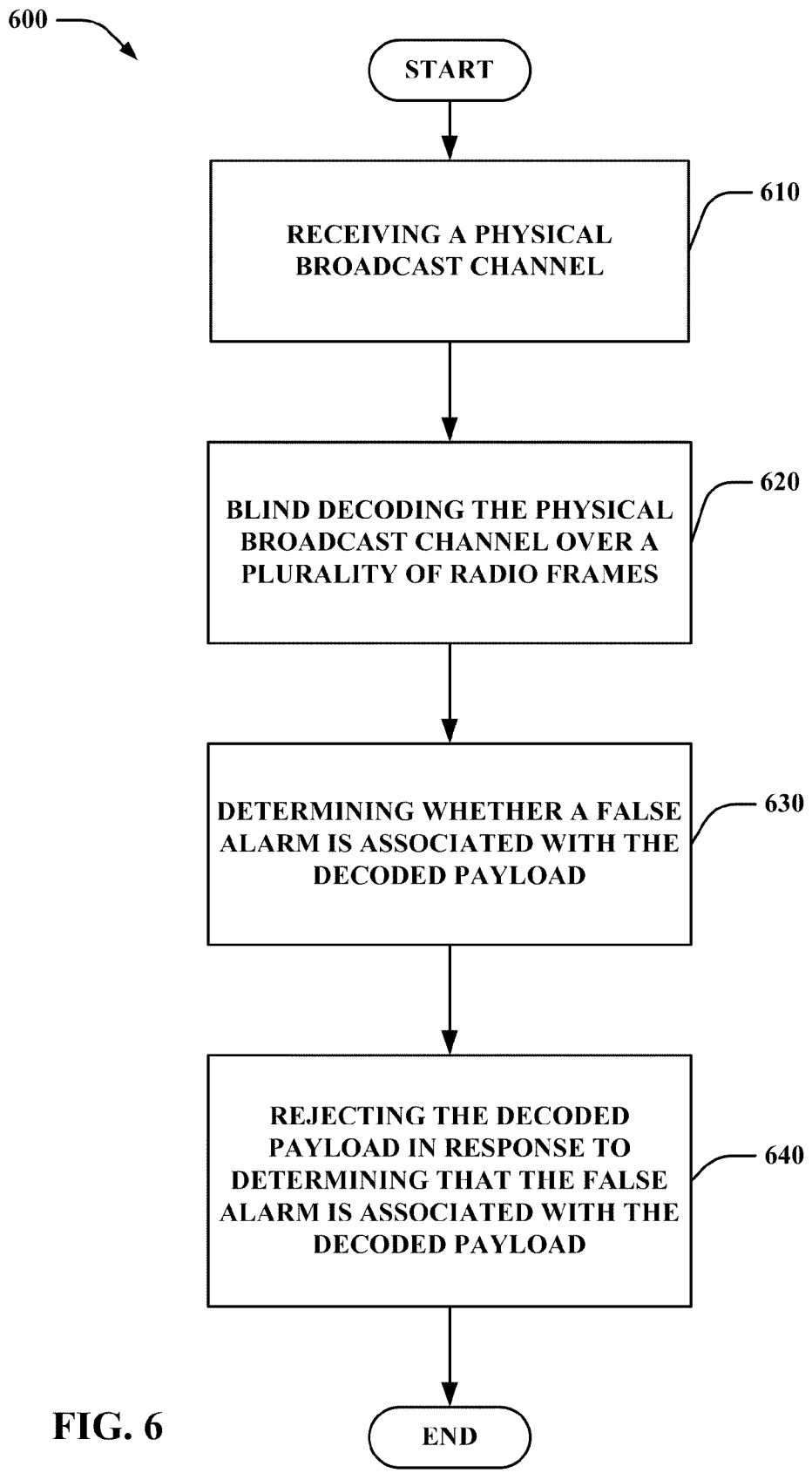
FIG. 6 is a flowchart of a further exemplary process for reliable channel decoding in accordance with various aspects set forth herein.

FIG. 6 is a flowchart of a method for reliable channel decoding in accordance with various aspects set forth herein. At 610, method 600 can include receiving a physical broadcast channel. At 620, method 600 can include blind decoding the physical broadcast channel. In some embodiments, the blind decoding is performed over a plurality of radio frames.

At 630, method 600 can include determining whether a false alarm is associated with the decoded payload. In some embodiments, determining whether a false alarm is associated with a decoded payload includes comparing a plurality of cyclic redundancy checks (CRCs) on preambles of a plurality of decoded payloads, wherein the decoded payload is a one of the plurality of decoded payloads. The method may also include selecting one or more decoded payloads associated with a largest number of CRC passes during blind decoding in response to determining that more than one of the plurality of decoded payloads are associated with cyclic redundancy checks that are acceptable. The method can also include selecting one of the acceptable payloads having a largest number of CRC passes and/or a largest RV index from the decoded payloads that are deemed acceptable.

At 640, method 600 can include rejecting the decoded payload in response to determining that the false alarm is associated with the decoded payload.

Figure 7A:
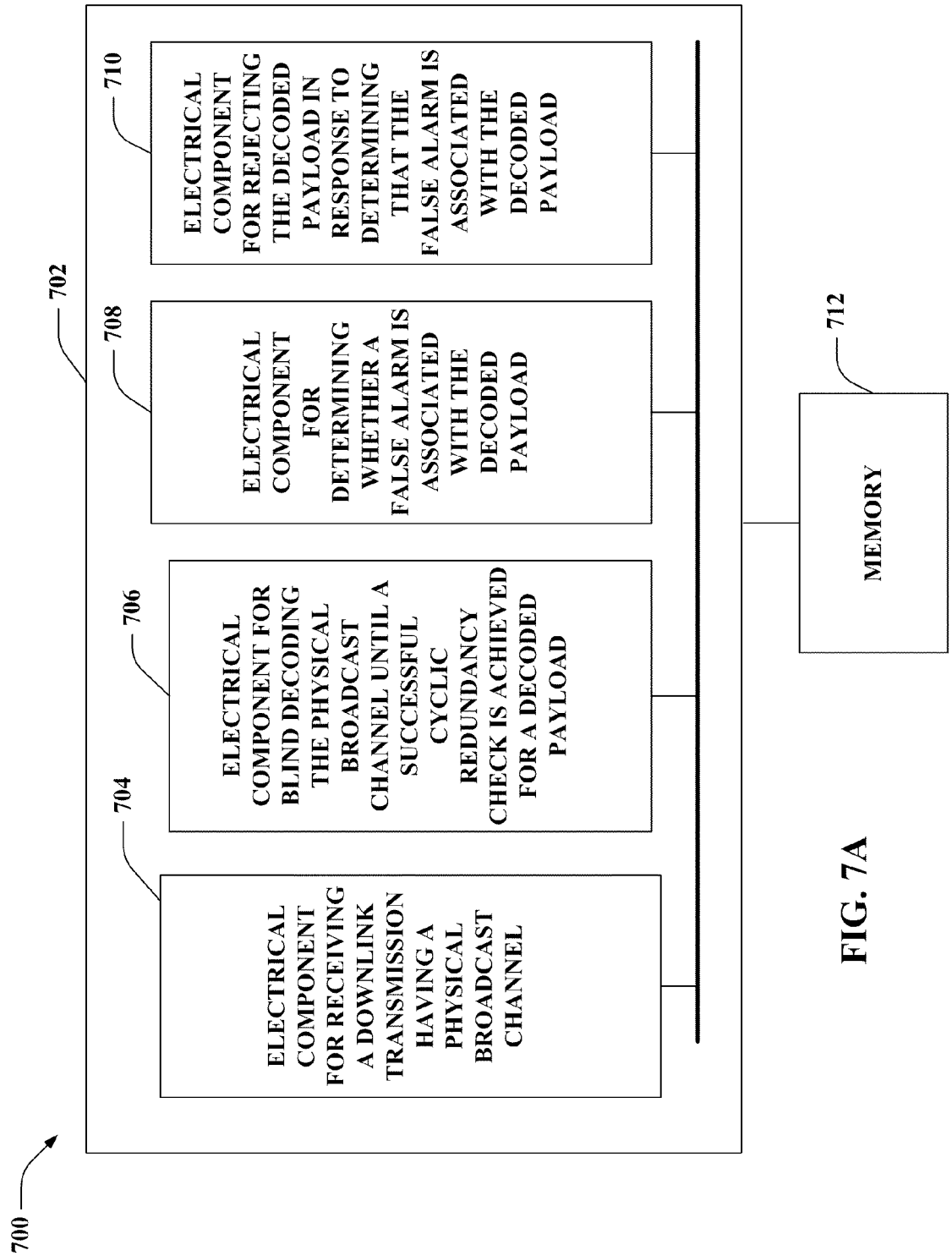
FIGS. 7 and 8 are block diagrams of exemplary systems for reliable channel decoding in accordance with various aspects set forth herein.

FIG. 7A is an illustration of a block diagram of an example system for reliable channel decoding in accordance with various aspects set forth herein. It is to be appreciated that system 700 is represented as including functional blocks, which can be functional blocks that represent functions implemented by a processor, hardware, software, firmware, or combination thereof.

System 700 can include a logical or physical grouping 702 of electrical components. For example, logical or physical grouping 702 can include an electrical component 704 for receiving a downlink transmission having a physical broadcast channel. The PBCH may include system information which may be received over a plurality of radio frames.

Logical or physical grouping 702 can include an electrical component 706 for blind decoding the physical broadcast channel. In some embodiments, blind decoding the physical broadcast channel is performed until a successful cyclic redundancy check is achieved for a decoded payload and comprises comparing a previous successfully decoded payload with the decoded payload.

The blind decoding can be performed over a plurality of radio frames in which determining whether a false alarm is associated with a decoded payload includes determining whether a cyclic redundancy check for a first decoded payload is acceptable during the blind decoding for a first one of the plurality of radio frames and whether a RV index associated with the first decoded payload is less than a selected value. The first decoded payload can be stored in a memory in response to determining that the CRC for the first decoded payload is acceptable during the blind decoding for a first one of the plurality of radio frames. Additionally, it can be determined whether a CRC for the decoded payload is acceptable during the blind decoding for a second one of the plurality of radio frames that is received later in time than the first one of the plurality of radio frames.

In some embodiments, the selected value of the RV index can be a value less than 3. In some embodiments, the selected value can be at least one of 0, 1 or 2. In some embodiments, the selected value can be at least one of 1 or 2.

Logical or physical grouping 702 can include an electrical component 708 for determining whether a false alarm is associated with the decoded payload. In some embodiments, determining whether a false alarm is associated with the decoded payload comprises detecting a violation condition. In some embodiments, the violation condition is detected when a first bandwidth (BW) field associated with the previous successfully decoded payload is not identical to a second BW field associated with the decoded payload.

In some embodiments, the violation condition is detected when the first BW field associated with the previous successfully decoded payload and a first reserved bit associated with the previous successfully decoded payload are not identical to the second BW field associated with the decoded payload and a second reserved bit associated with the decoded payload, respectively.

In some embodiments, the violation condition is detected when a system frame number associated with the decoded payload is indicative of an incorrect number of physical broadcast channel frames between a frame associated with the decoded payload and a frame associated with the previous successfully decoded payload.

In some embodiments, the violation condition is detected when an RV index is inconsistent with an expectation for a known frame boundary for the physical broadcast channel.

In some embodiments, the violation condition is detected when a PCFICH value is inconsistent with an expected PHICH duration. As an example, an inconsistency may be detected when the PCFICH value is 1 or 2 and the PHICH duration is other than one OFDM symbol.

Logical or physical grouping 702 can include an electrical component 710 for rejecting the decoded payload in response to determining that the false alarm is associated with the decoded payload.

In some embodiments, the logical or physical grouping 702 can also include an electrical component (not shown) for accepting the decoded payload in response to determining that the cyclic redundancy check for the decoded payload is acceptable during the blind decoding for the second one of the plurality of radio frames, and conditions are met. The conditions can include an RV index associated with the decoded payload is a value indicative of the selected value plus one (when the first one of the plurality of radio frames is immediately prior to the second one of the plurality of frames) and the decoded payload matches the first decoded payload.

In some embodiments, the selected value of the RV index can be a value less than 3. In some embodiments, the selected value can be at least one of 0, 1 or 2. In some embodiments, the selected value can be at least one of 1 or 2.

Logical or physical grouping 702 can include an electrical component 712 for storing such as a memory element. The electrical component 712 for storing can be configured to store physical broadcast channel, payload information, decoded payload information, hypotheses used for blind decoding, and expected values of parameters, among other information, as described with reference to FIG. 7A.

In some embodiments, the logical or physical grouping 702 can also include an electrical component (not shown) for discarding the first decoded payload and storing the decoded payload in response to determining that the CRC for the decoded payload is acceptable during the blind decoding for the second one of the plurality of radio frames, and the conditions are not met. The conditions can include an RV index associated with the decoded payload is a value indicative of the selected value plus one (when the first one of the plurality of radio frames is immediately prior to the second one of the plurality of frames) and the decoded payload matches the first decoded payload.

In some embodiments, the logical or physical grouping 702 can also include an electrical component (not shown) for discarding the first decoded payload in response to determining that the CRC for the decoded payload is not acceptable during the blind decoding for the second one of the plurality of radio frames.

Figure 7B:
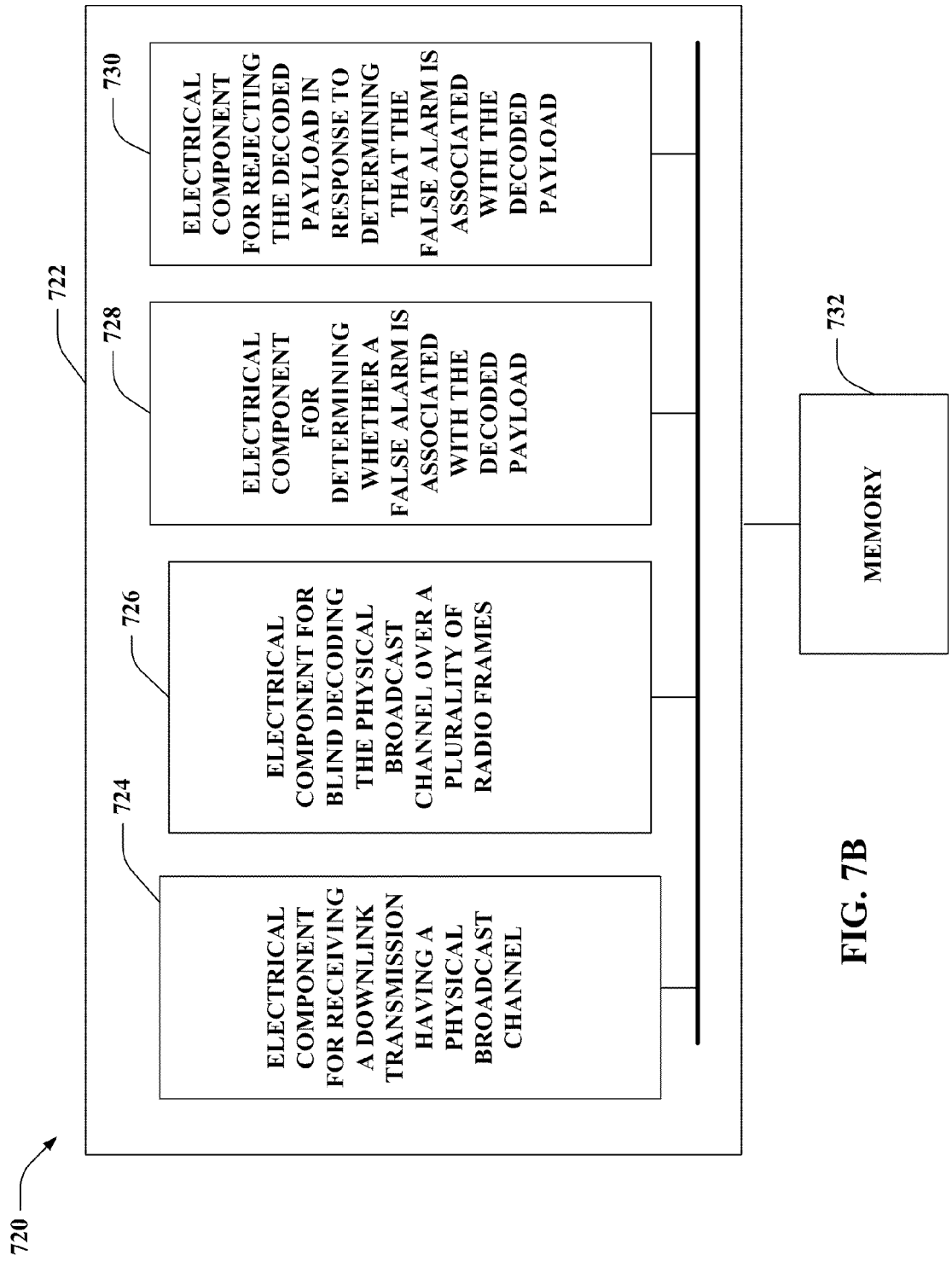

FIG. 7B is an illustration of a block diagram of an example system for reliable channel decoding in accordance with various aspects set forth herein. It is to be appreciated that system 720 is represented as including functional blocks, which can be functional blocks that represent functions implemented by a processor, hardware, software, firmware, or combination thereof. System 720 can include a logical or physical grouping 722 of electrical components.

The electrical components can act in conjunction. For instance, the logical or physical grouping 722 can include an electrical component 724 for receiving a physical broadcast channel. Logical or physical grouping 722 can include an electrical component 726 for blind decoding the physical broadcast channel. In some embodiments, the blind decoding is performed over a plurality of radio frames.

Logical or physical grouping 722 can include an electrical component 728 for determining whether a false alarm is associated with the decoded payload. In some embodiments, determining whether a false alarm is associated with a decoded payload includes comparing a plurality of cyclic redundancy checks on preambles of a plurality of decoded payloads, wherein the decoded payload is a one of the plurality of decoded payloads. It may also include selecting one or more decoded payloads associated with a largest number of CRC passes during blind decoding in response to determining that more than one of the plurality of decoded payloads are associated with CRC that are acceptable. In that case, one of the acceptable payloads associated with a largest number of CRC passes and a largest RV index may be selected.

Logical or physical grouping 722 can include an electrical component 730 for rejecting the decoded payload in response to determining that the false alarm is associated with the decoded payload.

Logical or physical grouping 722 can include an electrical component 732 for storing such as a memory element. The electrical component 732 for storing can be configured to store physical broadcast channel, payload information, decoded payload information, hypotheses used for blind decoding, and expected values of parameters, among other information, as described with reference to FIG. 7B.

Figure 8A:
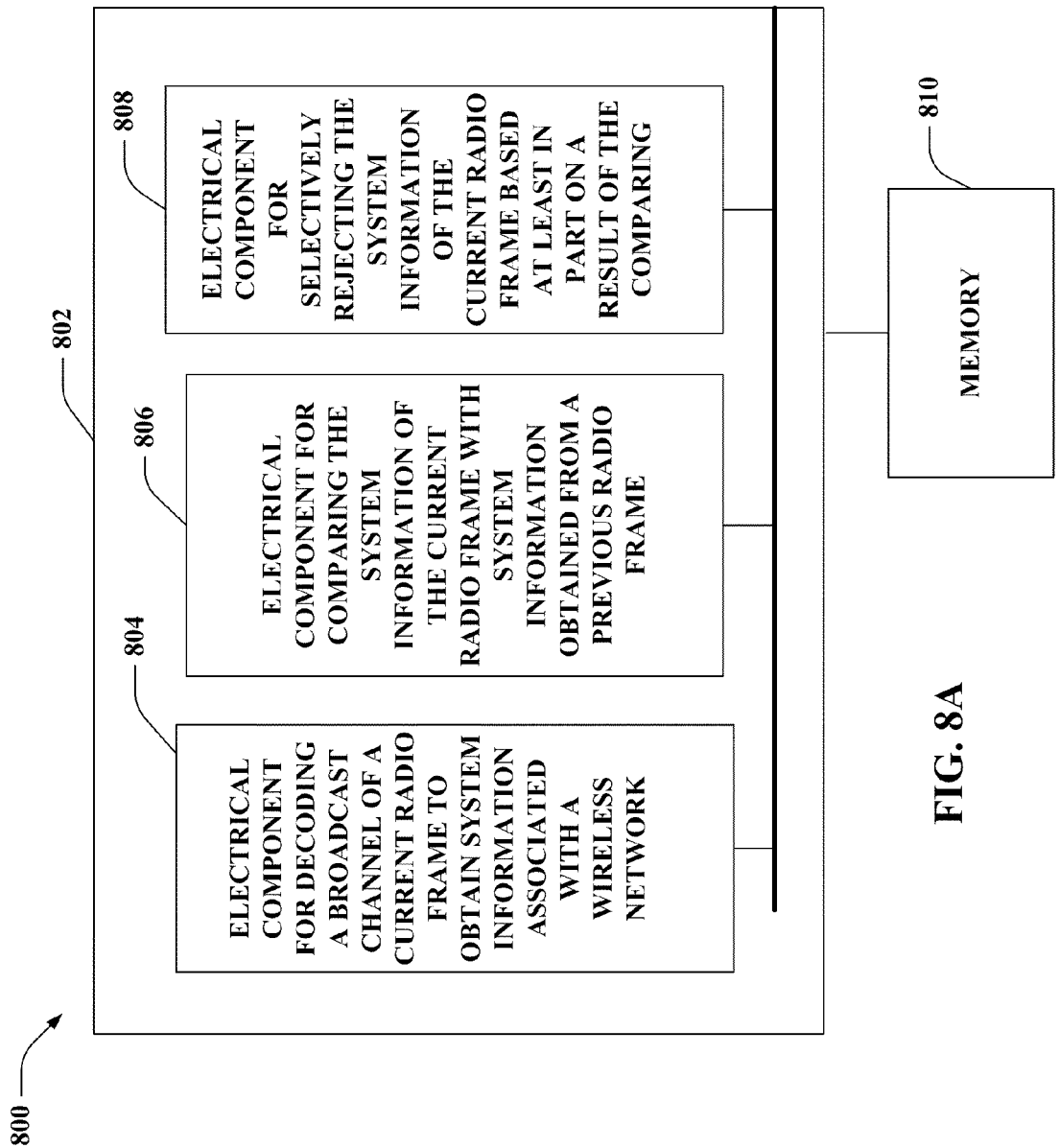

FIG. 8A is an illustration of a block diagram of an example system for reliable channel decoding in accordance with various aspects set forth herein. It is to be appreciated that system 800 is represented as including functional blocks, which can be functional blocks that represent functions implemented by a processor, hardware, software, firmware, or combination thereof.

System 800 can include a logical or physical grouping 802 of electrical components. For example, logical or physical grouping 802 can include an electrical component 804 for decoding a broadcast channel of a current radio frame to obtain system information associated with a wireless network and an electrical element for storing 810. Decoding the broadcast channel can include testing a plurality of hypotheses in some embodiments. The electrical element for storing 810 can maintain a copy of system information obtained from multiple radio frames, hypotheses used for blind decoding, PBCH payloads, expected values of parameters, etc.

Logical or physical grouping 802 can include an electrical component 806 for comparing the system information of the current radio frame with system information obtained from a previous radio frame. In some embodiments, the comparison is initiated in response to passing a cyclic redundancy check associated with decoding the broadcast channel.

In some embodiments, the system information comprises a bandwidth (BW) indicator, and the system information of the current radio frame is rejected when the BW indicator of the current radio frame does not match a BW indicator of the previous radio frame. In some embodiments, the system information from the current radio frame is selectively rejected based at least in part on an system frame number (SFN) associated with the previous frame.

In some embodiments, the system information comprises a redundancy version (RV) and comparing the system information of the current frame with the system information from a previous radio frame includes comparing a first RV associated with the current radio frame with an expected RV determined from the previous radio frame. In this embodiment, the system information of the current radio frame can be rejected when the first RV does not match the expected RV.

Logical or physical grouping 802 can also include an electrical component 808 for selectively rejecting the system information of the current radio frame based at least in part on a result of the comparing.

Figure 8B:
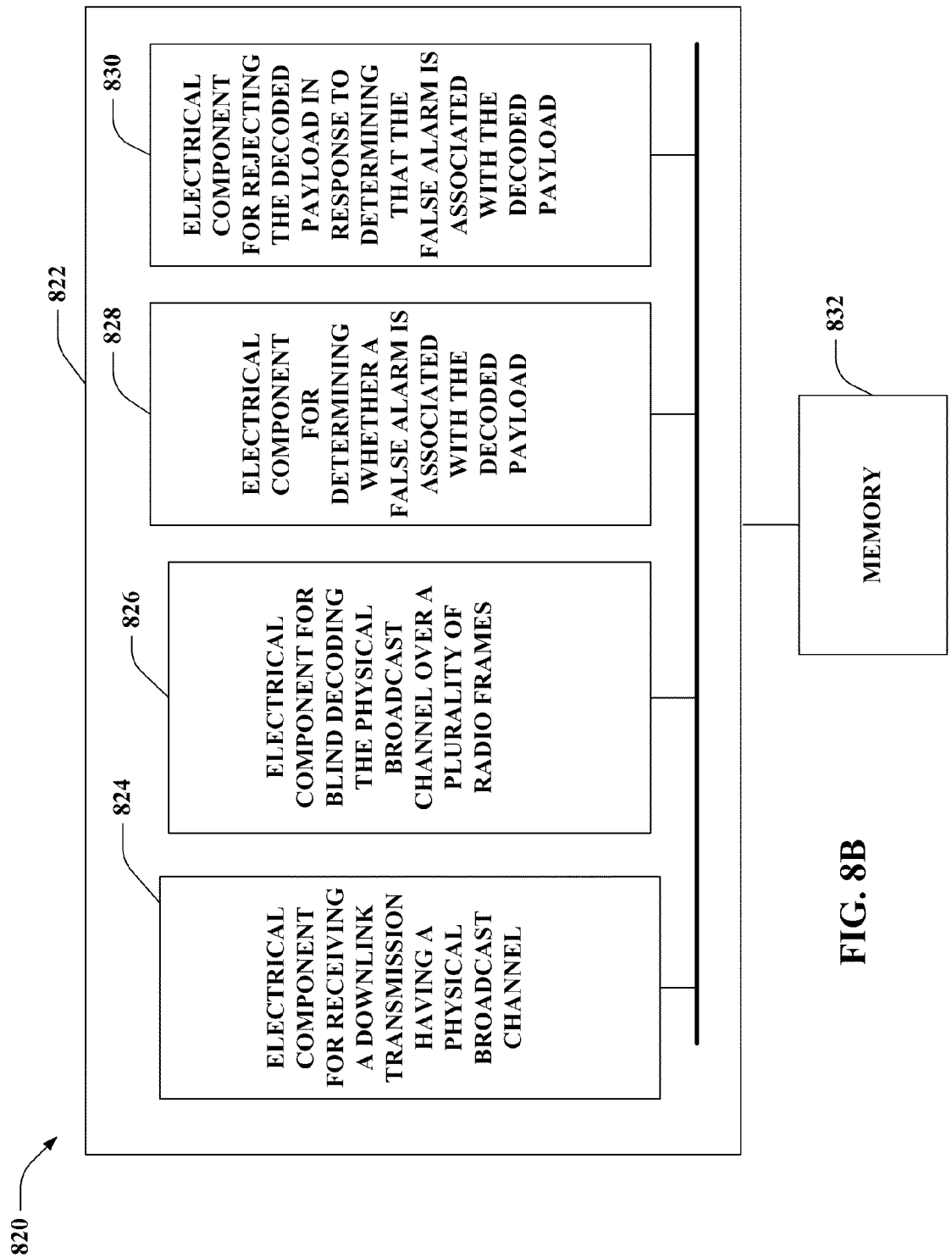

FIG. 8B is an illustration of a block diagram of an example system for reliable channel decoding in accordance with various aspects set forth herein. It is to be appreciated that system 820 is represented as including functional blocks, which can be functional blocks that represent functions implemented by a processor, hardware, software, firmware, or combination thereof. System 820 can include a logical or physical grouping 822 of electrical components.

The electrical components can act in conjunction. For instance, the logical or physical grouping 822 can include an electrical component 824 for receiving a downlink transmission having a physical broadcast channel (PBCH) and an electrical component 826 for decoding the PBCH to obtain a first decoded PBCH payload. Logical or physical grouping 822 can include an electrical component 828 for detecting an error condition related to the first decoded PBCH payload based at least in part on a second decoded PBCH payload obtained prior to the first decoded PBCH payload.

Logical or physical grouping 822 can include an electrical component 830 for rejecting the first decoded PBCH payload in response to detecting the error condition.

Decoding the PBCH can be performed until a successful CRC is achieved for the first decoded PBCH payload. In some embodiments, decoding can also further comprise testing a plurality of hypotheses.

In some embodiments, detecting the error condition includes determining that a bandwidth (BW) field associated with the first decoded PBCH payload does not match a BW field associated with the second decoded PBCH payload. In some embodiments, detecting the error condition includes determining that the BW field associated with the first decoded payload and a reserved bit associated with the first decoded PBCH payload do not match a BW field associated with the second decoded PBCH payload and a reserved bit associated with the second decoded PBCH payload, respectively.

In some embodiments, detecting the error condition comprises determining a system frame number associated with the first decoded PBCH payload is indicative of an incorrect number of PBCH frames between a frame associated with the first decoded PBCH payload and a frame associated with the second decoded PBCH payload. In some embodiments, detecting the error condition comprises determining a redundancy value index is included with an expectation for a known frame boundary for the PBCH. In some embodiments, detecting the error condition comprises determining a PCFICH value is inconsistent with an expected PHICH duration.

In some embodiments, decoding is performed over a plurality of radio frames and determining whether the error condition is related to the first decoded PBCH payload includes determining whether a cyclic redundancy check for the first decoded PBCH payload is determined to be acceptable during the decoding for a first one of the plurality of radio frames and whether an RV index associated with the first decoded PBCH payload is less than a selected value. It may also include storing the first decoded PBCH payload in response to determining that the CRC for the first decoded PBCH payload is acceptable during the decoding for a first one of the plurality of radio frames and determining whether a CRC for the first decoded PBCH payload is acceptable during the decoding for a second one of the plurality of radio frames received later in time than the first one of the plurality of radio frames.

In some embodiments, the logical or physical grouping 822 can include an electrical component (not shown) for accepting the first decoded PBCH payload in response to determining that the CRC for the first decoded PBCH payload is acceptable during the decoding for the second one of the plurality of radio frames, and conditions are met. The conditions may include determining an RV index associated with the first decoded PBCH payload is a value indicative of the selected value plus one (when the first one of the plurality of radio frames is immediately prior to the second one of the plurality of radio frames) and the first decoded PBCH payload matches the second decoded PBCH payload.

In some embodiments, the logical or physical grouping 822 can include an electrical component (not shown) for discarding the second decoded PBCH payload and storing the first decoded PBCH payload in response to determining that the cyclic redundancy check for the first decoded PBCH payload is acceptable during the decoding for the second one of the plurality of radio frames, and conditions are not met. The conditions may include an RV index associated with the first decoded PBCH payload is a value indicative of the selected value plus one (when the first one of the plurality of radio frames is immediately prior to the second one of the plurality of radio frames) and the first decoded PBCH payload matches the second decoded PBCH payload.

In some embodiments, the logical or physical grouping 822 can include an electrical component (not shown) for discarding the first decoded PBCH payload in response to determining that the CRC for the first decoded PBCH payload is not acceptable during the decoding for the second one of the plurality of radio frames.

In some embodiments, decoding is performed over a plurality of radio frames and the determining whether the error condition is related to the first decoded PBCH payload includes comparing a plurality of cyclic redundancy checks on preambles of a plurality of decoded payloads. It can also include selecting one or more decoded payloads associated with a largest number of cyclic redundancy check passes during decoding when that more than one of the plurality of decoded payloads are associated with cyclic redundancy checks that are acceptable. In that case, one of a one or more decoded payloads associated with a largest number of cyclic redundancy check passes and/or a largest RV index may selected.

Figure 9:
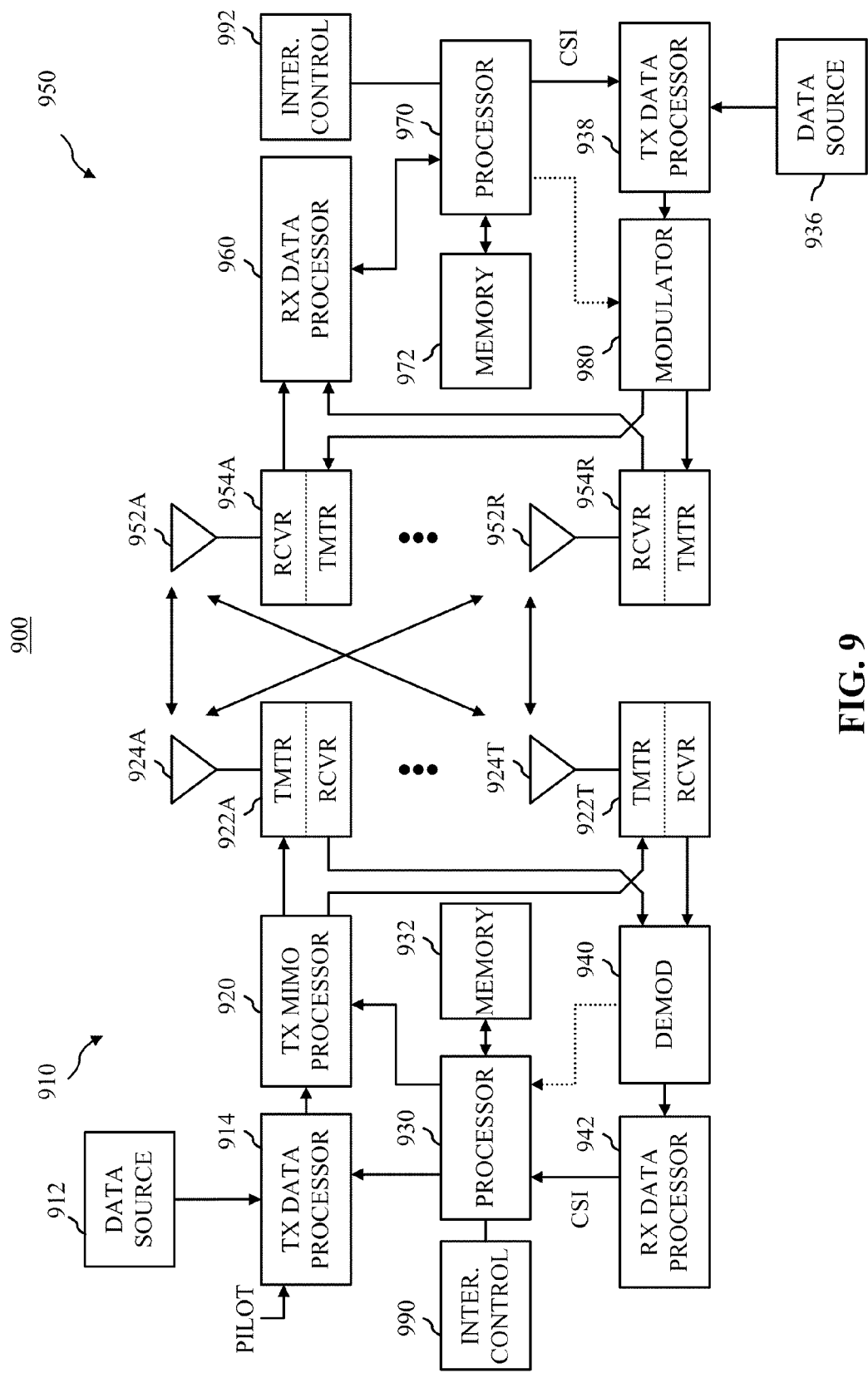
FIG. 9 shows an exemplary wireless communication system in which the embodiments described herein can be employed.

FIG. 9 shows an example wireless communication system in which the embodiments described herein can be employed in accordance with various aspects set forth herein. The teachings herein may be incorporated into a node (e.g., a device) employing various components for communicating with at least one other node. FIG. 9 depicts several sample components that may be employed to facilitate communication between nodes. Specifically, FIG. 9 illustrates a wireless device 910 (e.g., an access point) and a wireless device 950 (e.g., an access terminal) of a wireless communication system 900 (e.g., MIMO system). At the device 910, traffic data for a number of data streams is provided from a data source 912 to a transmit (TX) data processor 914.

In some embodiments, the traffic data includes control information transmitted on a DL. The control information can be corrupted by interference. The wireless device 910 can be configured to process the control information prior to transmission to the wireless device 950 for increased reliability in decoding the control information at the wireless device 950. In particular, the wireless device 950 can be configured to detect error conditions leading to false alarms and/or to perform blind decoding, as described herein.

In some aspects, each data stream is transmitted over a respective transmit antenna. The TX data processor 914 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 930. A data memory 932 may store program code, data, and other information used by the processor 930 or other components of the device 910.

The modulation symbols for all data streams are then provided to a TX MIMO processor 920, which may further process the modulation symbols (e.g., for OFDM). The TX MIMO processor 920 then provides $N_T$ modulation symbol streams to $N_T$ transceivers (XCVR) 922A through 922T. In some aspects, the TX MIMO processor 920 applies beamforming weights to the symbols of the data streams and to the antenna from which the symbol is being transmitted.

Each transceiver 922 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 922A through 922T are then transmitted from $N_T$ antennas 924A through 924T, respectively.

At the device 950, the transmitted modulated signals are received by $N_R$ antennas 952A through 952R and the received signal from each antenna 952 is provided to a respective transceiver (XCVR) 954A through 954R. Each transceiver 954 conditions (e.g., filters, amplifies, and downconverts) a respective received signal, digitizes the conditioned signal to provide samples, and further processes the samples to provide a corresponding "received" symbol stream.

A receive (RX) data processor 960 then receives and processes the $N_R$ received symbol streams from $N_R$ transceivers 954 based on a particular receiver processing technique to provide $N_T$ "detected" symbol streams. The RX data processor 960 then demodulates, deinterleaves, and decodes each detected symbol stream to recover the traffic data for the data stream. The processing by the RX data processor 960 is complementary to that performed by the TX MIMO processor 920 and the TX data processor 914 at the device 910.

A processor 970 periodically determines which pre-coding matrix to use (discussed below). The processor 970 formulates a reverse link message comprising a matrix index portion and a rank value portion. A data memory 972 may store program code, data, and other information used by the processor 970 or other components of the device 950.

The reverse link message may comprise various types of information regarding the communication link and/or the received data stream. The reverse link message is then processed by a TX data processor 938, which also receives traffic data for a number of data streams from a data source 936, modulated by a modulator 980, conditioned by the transceivers 954A through 954R, and transmitted back to the device 910.

At the device 910, the modulated signals from the device 950 are received by the antennas 924, conditioned by the transceivers 922, demodulated by a demodulator (DEMOD) 940, and processed by a RX data processor 942 to extract the reverse link message transmitted by the device 950. The processor 930 then determines which pre-coding matrix to use for determining the beam-forming weights then processes the extracted message.

FIG. 9 also illustrates that the communication components may include one or more components that perform interference control operations as taught herein. For example, an interference (INTER.) control component 990 may cooperate with the processor 930 and/or other components of the device 910 to send/receive signals to/from another device (e.g., device 950) as taught herein. Similarly, an interference control component 992 may cooperate with the processor 970 and/or other components of the device 950 to send/receive signals to/from another device (e.g., device 910). It should be appreciated that for each device 910 and 950 the functionality of two or more of the described components may be provided by a single component. For example, a single processing component may provide the functionality of the interference control component 990 and the processor 930 and a single processing component may provide the functionality of the interference control component 992 and the processor 970.

In an aspect, logical channels can be classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can include a Multicast Control Channel (MCCH), which is a Point-to-multipoint DL channel used for transmitting Multimedia Broadcast and Multicast Service (MBMS) scheduling and control information for one or several Multicast Traffic Channels (MTCHs). Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include an MTCH for Point-to-multipoint DL channel for transmitting traffic data.

In an aspect, Transport Channels are classified into DL and UL. DL Transport Channels can include a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described herein, or a combination thereof.

When the embodiments are implemented in software, firmware, middleware or microcode, program code or code segments, they can be stored in a machine-readable medium (or a computer-readable medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For some implementations, the techniques described herein can be implemented with modules (e.g., procedures, functions, and so on) that are executed by a processor or represent dedicated circuitry for performing the functions described herein. Instructions and data can be stored in memory units. The memory units can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of wireless communication, comprising:
    decoding a broadcast channel of a current radio frame to obtain system information associated with a wireless network;
    comparing a physical control format indicator channel (PCFICH) value of the current frame with an expected physical hybrid automatic repeat request indicator channel (PHICH) duration, the comparing being initiated when a cyclic redundancy check associated with the current radio frame has passed; and
    rejecting the system information of the current radio frame when the PCFICH value is one or two and the PHICH duration is greater than or less than one orthogonal frequency division multiplexed (OFDM) symbol.

2. The method of claim 1, wherein decoding the broadcast channel comprises testing a plurality of hypotheses.

3. The method of claim 2, wherein the system information of each frame comprises a bandwidth (BW) indicator, and
    further comprising rejecting the system information of the current radio frame when the BW indicator of the current radio frame does not match a BW indicator of the previous radio frame.

4. The method of claim 2, further comprising rejecting the system information from the current radio frame based at least in part on a system frame number (SFN) associated with the previous frame.

5. The method of claim 2, wherein the system information of each frame comprises a redundancy version (RV), and the method further comprises:
    comparing a first RV associated with the current radio frame with an expected RV determined from the system information from the previous radio frame; and
    rejecting the system information of the current radio frame when the first RV does not match the expected RV.

6. A non-transitory computer-readable medium having program code recorded thereon, the program code comprising:
    program code to decode a broadcast channel of a current radio frame to obtain system information associated with a wireless network;
    program code to compare a physical control format indicator channel (PCFICH) value of the current frame with an expected physical hybrid automatic repeat request indicator channel (PHICH) duration, the comparing being initiated when a cyclic redundancy check associated with the current radio frame has passed; and
    program code to reject the system information of the current radio frame when the PCFICH value is one or two and the PHICH duration is greater than or less than one orthogonal frequency division multiplexed OFDM symbol.

7. The non-transitory computer-readable medium of claim 6, wherein the program code to decode the broadcast channel comprises program code to test a plurality of hypotheses.

8. The non-transitory computer-readable medium of claim 7, wherein the system information of each frame comprises a bandwidth (BW) indicator, and the program code to reject comprises program code to reject the system information of the current radio frame when the BW indicator of the current radio frame does not match a BW indicator of the previous radio frame.

9. The non-transitory computer-readable medium of claim 7, wherein the program code to reject comprises program code to reject the system information from the current radio frame based at least in part on a system frame number (SFN) associated with the previous frame.

10. The non-transitory computer-readable medium of claim 7, wherein:
    the system information of each frame comprises a redundancy version (RV);
    the program code to compare comprises program code to compare a first RV associated with the current radio frame with an expected RV determined from the previous radio frame; and
    the program code to reject comprises program code to reject the system information of the current radio frame when it is determined that the first RV does not match the expected RV.

11. An apparatus, comprising:
    means for decoding a broadcast channel of a current radio frame to obtain system information associated with a wireless network;
    means for comparing a physical control format indicator channel (PCFICH) value of the current frame with an expected physical hybrid automatic repeat request indicator channel (PHICH), the comparing being initiated when a cyclic redundancy check associated with the current radio frame has passed; and
    means for rejecting the system information of the current radio frame when the PCFICH value is one or two and the PHICH duration is greater than or less than one orthogonal frequency division multiplexed OFDM symbol.

12. The apparatus of claim 11, wherein the means for decoding the broadcast channel comprises means for testing a plurality of hypotheses.

13. The apparatus of claim 11, wherein the system information of each frame comprises a bandwidth (BW) indicator, and apparatus further comprises means for rejecting the system information of the current radio frame when the BW indicator of the current radio frame does not match a BW indicator of the previous radio frame.

14. The apparatus of claim 11, further comprising means for rejecting the system information from the current radio frame based at least in part on a system frame number (SFN) associated with the previous frame.

15. The apparatus of claim 11, wherein the system information of each frame comprises a redundancy version (RV), and the apparatus further comprises:
   means for comparing a first RV associated with the current radio frame with an expected RV determined from the previous radio frame; and
   means for rejecting the system information of the current radio frame when the first RV does not match the expected RV.

16. An apparatus, comprising:
   a memory unit; and
   at least one processor coupled to the memory, the at least one processor configured to:
      decode a broadcast channel of a current radio frame to obtain system information associated with a wireless network; and
      compare a physical control format indicator channel (PCFICH) value of the current frame with an expected physical hybrid automatic repeat request indicator channel (PHICH) duration, the comparing being initiated when a cyclic redundancy check associated with the current radio frame has passed; and
      reject the system information of the current radio frame when the PCFICH value is one or two and the PHICH duration is greater than or less than one orthogonal frequency division multiplexed OFDM symbol.

17. The apparatus of claim 16, wherein the at least one processor is further configured to test a plurality of hypotheses.

18. The apparatus of claim 17, wherein:
   the system information of each frame comprises a bandwidth (BW) indicator, and
   the at least one processor is further configured to reject the system information of the current radio frame when the BW indicator of the current radio frame does not match a BW indicator of the previous radio frame.

19. The apparatus of claim 17, wherein the at least one processor is further configured to reject the system information from the current radio frame based at least in part on a system frame number (SFN) associated with the previous frame.

20. The apparatus of claim 17, wherein:
   the system information of each frame comprises a redundancy version (RV), and
   the at least one processor is further configured:
      to compare a first RV associated with the current radio frame with an expected RV determined from the previous radio frame; and
      to reject the system information of the current radio frame when the first RV does not match the expected RV.

21. A method for decoding a broadcast channel in a wireless communication system, the method comprising:
   receiving a downlink transmission comprising a physical broadcast channel (PBCH);
   decoding the PBCH:
      to obtain a first decoded PBCH payload, the decoding being performed over a plurality of radio frames,
      to determine whether a cyclic redundancy check (CRC) for the first decoded PBCH payload is acceptable, the determining for the CRC being performed during a decoding of a first radio frame of the plurality of radio frames, and
      to determine whether a redundancy value (RV) index associated with the first decoded PBCH payload is less than a selected value;
   detecting an error condition related to the first decoded PBCH payload based at least in part on a second decoded PBCH payload obtained prior to the first decoded PBCH payload; and
   rejecting the first decoded PBCH payload in response to detecting the error condition.

22. The method of claim 21, wherein:
   the PBCH is decoded until a successful cyclic redundancy check is achieved for the first decoded PBCH payload, and
   decoding the PBCH comprises testing a plurality of hypotheses.

23. The method of claim 22, wherein detecting the error condition comprises one or more of:
   determining that a bandwidth (BW) field associated with the first decoded PBCH payload does not match a BW field associated with the second decoded PBCH payload,
   determining that the BW field associated with the first decoded payload and a reserved bit associated with the first decoded PBCH payload do not match a BW field associated with the second decoded PBCH payload and a reserved bit associated with the second decoded PBCH payload, respectively, or
   a combination thereof.

24. The method of claim 22, wherein detecting the error condition comprises one or more of:
   determining that a system frame number associated with the first decoded PBCH payload is indicative of an incorrect number of PBCH frames between a frame associated with the first decoded PBCH payload and a frame associated with the second decoded PBCH payload,
   determining that a redundancy value (RV) index is inconsistent with an expectation for a known frame boundary for the PBCH,
   determining that a physical control format indicator channel (PCFICH) value is inconsistent with an expected Physical HARQ Indicator Channel (PHICH) duration, or
   a combination thereof.

25. The method of claim 24, wherein the PCFICH value is determined to be inconsistent with the expected PHICH duration when the PCFICH value is one or two and the PHICH duration is greater than or less than one OFDM symbol.

26. The method of claim 21, further comprising:
   storing the first decoded PBCH payload when the CRC for the first decoded PBCH payload is determined to be acceptable; and
   wherein detecting the error condition comprises determining whether a CRC for the first decoded PBCH payload is acceptable during a decoding of a second frame of the plurality of radio frames, wherein the second frame of the plurality of radio frames is later in time than a first frame of the plurality of radio frames.

27. The method of claim 26, further comprising accepting the first decoded PBCH payload in response to:

determining that the CRC for the first decoded PBCH payload is acceptable during the decoding for the second frame of the plurality of radio frames;

determining that an RV index associated with the first decoded PBCH payload is a specific value when the first frame of the plurality of radio frames is immediately prior to the second frame of the plurality of radio frames; and determining that the first decoded PBCH payload matches the second decoded PBCH payload.

28. The method of claim 26, further comprising discarding the second decoded PBCH payload and storing the first decoded PBCH payload in response to:

determining that the CRC for the first decoded PBCH payload is acceptable during the decoding for the second frame of the plurality of radio frames;

determining that an RV index associated with the first decoded PBCH payload is not a specific value when the first frame of the plurality of radio frames is immediately prior to the second frame of the plurality of radio frames; and determining that the first decoded PBCH payload does not match the second decoded PBCH payload.

29. The method of claim 26, further comprising discarding the first decoded PBCH payload in response to determining that the CRC for the first decoded PBCH payload is not acceptable.

30. The method of claim 21, further comprising determining whether the error condition is related to the first decoded PBCH payload, by:

comparing a plurality of cyclic redundancy checks (CRCs) on preambles of a plurality of decoded payloads, wherein the first decoded PBCH payload is one of the plurality of decoded payloads;

selecting at least one decoded payload associated with a largest number of CRC passes when a plurality of decoded payloads are associated with acceptable CRCs; and selecting one of the at least one decoded payload associated with a largest redundancy value index when a plurality of the decoded payloads are associated with the largest number of CRC passes.

31. A non-transitory computer-readable medium having program code recorded thereon, the program code comprising:

program code to receive a downlink transmission comprising a physical broadcast channel (PBCH);

program code:

to decode the PBCH to obtain a first decoded PBCH payload, the decoding being performed over a plurality of radio frames, to determine whether a cyclic redundancy check (CRC) for the first decoded PBCH payload is acceptable, the determining for the CRC being performed during a decoding of a first radio frame of the plurality of radio frames, and to determine whether a redundancy value (RV) index associated with the first decoded PBCH payload is less than a selected value;

program code to detect an error condition related to the first decoded PBCH payload based at least in part on a second decoded PBCH payload obtained prior to the first decoded PBCH payload; and program code to reject the first decoded PBCH payload in response to detecting the error condition.

32. The non-transitory computer-readable medium of claim 31, wherein:

the program code to decode the PBCH is performed until a successful cyclic redundancy check is achieved for the first decoded PBCH payload, and the program code to decode comprises program code to test a plurality of hypotheses.

33. The non-transitory computer-readable medium of claim 32, wherein the program code to detect the error condition comprises one or more of:

program code to determine that a bandwidth (BW) field associated with the first decoded PBCH payload does not match a BW field associated with the second decoded PBCH payload, program code to determine that the BW field associated with the first decoded payload and a reserved bit associated with the first decoded PBCH payload do not match a BW field associated with the second decoded PBCH payload and a reserved bit associated with the second decoded PBCH payload, respectively, or a combination thereof.

34. The non-transitory computer-readable medium of claim 32, wherein the program code to detect the error condition comprises one or more of:

program code to determine a system frame number (SFN) associated with the first decoded PBCH payload is indicative of an incorrect number of PBCH frames between a frame associated with the first decoded PBCH payload and a frame associated with the second decoded PBCH payload, program code to determine a redundancy value (RV) index is included with an expectation for a known frame boundary for the PBCH, program code to determine a physical control format indicator channel (PCFICH) value is inconsistent with an expected Physical HARQ Indicator Channel (PHICH) duration, or a combination thereof.

35. The non-transitory computer-readable medium of claim 34, wherein the PCFICH value is determined to be inconsistent with the expected PHICH duration when the PCFICH value is one or two and the PHICH duration is greater than or less than one OFDM symbol.

36. The non-transitory computer-readable medium of claim 31, in which the program code further comprises:

program code to store the first decoded PBCH payload when the CRC for the first decoded PBCH payload is determined to be acceptable; and in which the program code to detect the error condition comprises program code to determine whether a CRC for the first decoded PBCH payload is acceptable during a decoding of a second frame of the plurality of radio frames, wherein the second frame of the plurality of radio frames is later in time than a first frame of the plurality of radio frames.

37. The non-transitory computer-readable medium of claim 36, further comprising program code to accept the first decoded PBCH payload in response to:

determining that the CRC for the first decoded PBCH payload is acceptable when the program code to decode is decoding the second frame of the plurality of radio frames;

determining that an RV index associated with the first decoded PBCH payload is a specific value when the first frame of the plurality of radio frames is immediately prior to the second frame of the plurality of radio frames; and determining that the first decoded PBCH payload matches the second decoded PBCH payload.

38. The non-transitory computer-readable medium of claim 36, further comprising program code to discard the second decoded PBCH payload and to store the first decoded PBCH payload in response to:
- determining that the CRC for the first decoded PBCH payload is acceptable when the program code to decode is decoding the second frame of the plurality of radio frames;
- determining that an RV index associated with the first decoded PBCH payload is not a specific value when the first frame of the plurality of radio frames is immediately prior to the second frame of the plurality of radio frames; and
- determining that the first decoded PBCH payload does not match the second decoded PBCH payload.

39. The non-transitory computer-readable medium of claim 36, further comprising program code to discard the first decoded PBCH payload in response to determining that the CRC for the first decoded PBCH payload is not acceptable.

40. The non-transitory computer-readable medium of claim 31,
further comprising program code to determine whether the error condition is related to the first decoded PBCH payload, the program code to determine comprising:
- program code to compare a plurality of CRCs on preambles of a plurality of decoded payloads, wherein the first decoded PBCH payload is one of the plurality of decoded payloads;
- program code to select at least one decoded payload associated with a largest number of cyclic redundancy check passes when a plurality of decoded payloads are associated with acceptable CRCs; and
- program code to select one of the at least one decoded payload associated with a largest redundancy value index when a plurality of the decoded payloads are associated with the largest number of CRC passes.

41. An apparatus, comprising:
means for receiving a downlink transmission comprising a physical broadcast channel (PBCH);
means for decoding the PBCH:
- to obtain a first decoded PBCH payload, the PBCH being decoded over a plurality of radio frames,
- to determine whether a cyclic redundancy check (CRC) for the first decoded PBCH payload is acceptable, the determining for the CRC being performed during a decoding of a first radio frame of the plurality of radio frames, and
- to determine whether a redundancy value (RV) index associated with the first decoded PBCH payload is less than a selected value;
means for detecting an error condition related to the first decoded PBCH payload based at least in part on a second decoded PBCH payload obtained prior to the first decoded PBCH payload; and
means for rejecting the first decoded PBCH payload in response to detecting the error condition.

42. The apparatus of claim 41, wherein:
the PBCH is decoded until a successful cyclic redundancy check (CRC) is achieved for the first decoded PBCH payload, and
the means for decoding further comprises means for testing a plurality of hypotheses.

43. The apparatus of claim 42, wherein the means for detecting the error condition comprises one or more of:
- determining that a bandwidth (BW) field associated with the first decoded PBCH payload does not match a BW field associated with the second decoded PBCH payload,
- determining that the BW field associated with the first decoded payload and a reserved bit associated with the first decoded PBCH payload do not match a BW field associated with the second decoded PBCH payload and a reserved bit associated with the second decoded PBCH payload, respectively, or
- a combination thereof.

44. The apparatus of claim 42, wherein the means for detecting the error condition comprises one or more of:
- determining that a system frame number associated with the first decoded PBCH payload is indicative of an incorrect number of PBCH frames between a frame associated with the first decoded PBCH payload and a frame associated with the second decoded PBCH payload,
- determining that a redundancy value (RV) index is included with an expectation for a known frame boundary for the PBCH,
- determining that a physical control format indicator channel (PCFICH) value is inconsistent with an expected Physical Hybrid ARQ Indicator Channel (PHICH) duration, or
- a combination thereof.

45. The apparatus of claim 44, wherein the PCFICH value is inconsistent with the expected PHICH duration when the PCFICH value is one or two and the PHICH duration is greater than or less than one OFDM symbol.

46. The apparatus of claim 41, further comprising:
means for storing the first decoded PBCH payload when the CRC for the first decoded PBCH payload is determined to be acceptable; and
wherein the means for detecting the error condition comprises means for determining whether a CRC for the first decoded PBCH payload is acceptable during a decoding of a second frame of the plurality of radio frames, wherein the second frame of the plurality of radio frames is later in time than a first frame of the plurality of radio frames.

47. The apparatus of claim 46, further comprising means for accepting the first decoded PBCH payload in response to:
- determining that the CRC for the first decoded PBCH payload is acceptable during the decoding for the second frame of the plurality of radio frames;
- determining that a RV index associated with the first decoded PBCH payload is a specific value when the first frame of the plurality of radio frames is immediately prior to the second frame of the plurality of radio frames; and
- determining that the first decoded PBCH payload matches the second decoded PBCH payload.

48. The apparatus of claim 46, further comprising means for
discarding the second decoded PBCH payload and storing the first decoded PBCH payload in response to:
- determining that the CRC for the first decoded PBCH payload is acceptable during the decoding for the second frame of the plurality of radio frames:
- determining that an RV index associated with the first decoded PBCH payload is not a specific value when the first frame of the plurality of radio frames is immediately prior to the second frame of the plurality of radio frames; and
- determining that the first decoded PBCH payload does not match the second decoded PBCH payload.

49. The apparatus of claim 46, further comprising means for
discarding the first decoded PBCH payload in response to determining that the CRC for the first decoded PBCH payload is not acceptable.

50. The apparatus of claim 41,
further comprising means for determining whether the error condition is related to the first decoded PBCH payload, the means for determining comprising:
means for comparing a plurality of CRCs on preambles of a plurality of decoded payloads, wherein the first decoded PBCH payload is one of the plurality of decoded payloads;
means for selecting at least one decoded payload associated with a largest number of CRC passes when a plurality of decoded payloads are associated with acceptable CRCs; and
means for selecting one of the at least one decoded payload associated with a largest redundancy value index when a plurality of the decoded payloads are associated with the largest number of CRC passes.

51. An apparatus, comprising:
a memory unit;
a transceiver configured to receive a downlink transmission comprising a physical broadcast channel (PBCH); and
at least one processor coupled to the memory unit, the at least one processor configured to:
decode the PBCH:
to obtain a first decoded PBCH payload, the PBCH being decoded over a plurality of radio frames,
to determine whether a cyclic redundancy check (CRC) for the first decoded PBCH payload is acceptable, the determining for the CRC being performed during a decoding of a first radio frame of the plurality of radio frames, and
to determine whether a redundancy value (RV) index associated with the first decoded PBCH payload is less than a selected value;
detect an error condition related to the first decoded PBCH payload based at least in part on a second decoded PBCH payload obtained prior to the first decoded PBCH payload; and
reject the first decoded PBCH payload in response to detecting the error condition.

52. The apparatus of claim 51, wherein the at least one processor is further configured to:
decode the PBCH until a successful cyclic redundancy check (CRC) is achieved for the first decoded PBCH payload, and
test a plurality of hypotheses.

53. The apparatus of claim 52, wherein the at least one processor is further configured to detect the error condition based at least in part on one or more of:
determining that a bandwidth (BW) field associated with the first decoded PBCH payload does not match a BW field associated with the second decoded PBCH payload,
determining that the BW field associated with the first decoded payload and a reserved bit associated with the first decoded PBCH payload do not match a BW field associated with the second decoded PBCH payload and a reserved bit associated with the second decoded PBCH payload, respectively, or
a combination thereof.

54. The apparatus of claim 52, wherein the at least one processor is further configured to detect the error condition based at least in part on one or more of:
determining that a system frame number (SFN) associated with the first decoded PBCH payload is indicative of an incorrect number of PBCH frames between a frame associated with the first decoded PBCH payload and a frame associated with the second decoded PBCH payload,
determining that a redundancy value (RV) index is included with an expectation for a known frame boundary for the PBCH,
determining that a physical control format indicator channel (PCFICH) value is inconsistent with an expected Physical Hybrid ARQ Indicator Channel (PHICH) duration, or
a combination thereof.

55. The apparatus of claim 54, wherein the PCFICH value is inconsistent with the expected PHICH duration when the PCFICH value is one or two and the PHICH duration is greater than or less than one OFDM symbol.

56. The apparatus of claim 51,
wherein the at least one processor is further configured to:
store the first decoded PBCH payload when the CRC for the first decoded PBCH payload is determined to be acceptable; and
detect the error condition based at least in part on determining whether a CRC for the first decoded PBCH payload is acceptable during a decoding of a second frame of the plurality of radio frames, wherein the second frame of the plurality of radio frames is later in time than a first frame of the plurality of radio frames.

57. The apparatus of claim 56, wherein the at least one processor is further configured to accept the first decoded PBCH payload in response to:
determining that the CRC for the first decoded PBCH payload is acceptable during the decoding for the second frame of the plurality of radio frames;
determining that an RV index associated with the first decoded PBCH payload is a specific value when the first frame of the plurality of radio frames is immediately prior to the second frame of the plurality of radio frames; and
determining that the first decoded PBCH payload matches the second decoded PBCH payload.

58. The apparatus of claim 56, wherein the at least one processor is further configured to discard the second decoded PBCH payload and store the first decoded PBCH payload in response to:
determining that the CRC for the first decoded PBCH payload is acceptable during the decoding for the second frame of the plurality of radio frames,
determining that an RV index associated with the first decoded PBCH payload is not a specific value when the first frame of the plurality of radio frames is immediately prior to the second frame of the plurality of radio frames; and
determining that the first decoded PBCH payload does not match the second decoded PBCH payload.

59. The apparatus of claim 56, wherein the at least one processor is further configured to discard the first decoded PBCH payload in response to determining that the CRC for the first decoded PBCH payload is not acceptable.

60. The apparatus of claim 51, wherein the at least one processor is further configured to:
determine whether the error condition is related to the first decoded PBCH payload, and
determine whether the error condition is related to the first decoded PBCH payload based at least in part on:

comparing a plurality of CRCs on preambles of a plurality of decoded payloads, wherein the first decoded PBCH payload is one of the plurality of decoded payloads;

selecting at least one decoded payload associated with a largest number of CRC passes when a plurality of decoded payloads are associated with acceptable CRCs; and selecting one of the at least one decoded payload associated with a largest redundancy value index when a plurality of the decoded payloads are associated with the largest number of CRC passes.

* * * * *